(12) United States Patent
Jhang et al.

(10) Patent No.: US 11,906,711 B2
(45) Date of Patent: Feb. 20, 2024

(54) OPTICAL IMAGING SYSTEM

(71) Applicant: GENIUS ELECTRONIC OPTICAL (XIAMEN) CO., LTD., Fujian (CN)

(72) Inventors: Jia-Sin Jhang, Taichung (TW); Yanxuan Yin, Fujian (CN); Maozong Lin, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 18/154,052

(22) Filed: Jan. 13, 2023

(65) Prior Publication Data

US 2023/0221534 A1  Jul. 13, 2023

Related U.S. Application Data

(63) Continuation of application No. 17/123,141, filed on Dec. 16, 2020, now Pat. No. 11,579,417, which is a continuation of application No. 16/687,707, filed on Nov. 19, 2019, now Pat. No. 10,901,188, which is a continuation of application No. 16/103,940, filed on Aug. 15, 2018, now Pat. No. 10,520,707, which is a continuation of application No. 15/585,165, filed on May 3, 2017, now Pat. No. 10,082,647.

(30) Foreign Application Priority Data

Mar. 24, 2017 (CN) .......................... 201710182902.5

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ....... G02B 13/0045; G02B 9/60; G02B 13/18
See application file for complete search history.

(56) References Cited

U.S. PATENT DOCUMENTS

2017/0285302 A1* 10/2017 Lai .......................... G02B 5/208

\* cited by examiner

*Primary Examiner* — James C. Jones
(74) *Attorney, Agent, or Firm* — JCIPRNET

(57) ABSTRACT

An optical imaging system includes a first lens element, a second lens element, a third lens element, a fourth lens element, and a fifth lens element from an object side to an image side in order along an optical axis. The first lens element to the fifth lens element each include an object-side surface and an image-side surface. The object-side surface of the second lens element has a convex portion in a vicinity of a periphery of the second lens element. The image-side surface of the third lens element has a convex portion in a vicinity of a periphery of the third lens element. The image-side surface of the fifth lens element has a concave portion in a vicinity of the optical axis, and the image-side surface of the fifth lens element has a convex portion in a vicinity of a periphery of the fifth lens element.

20 Claims, 30 Drawing Sheets

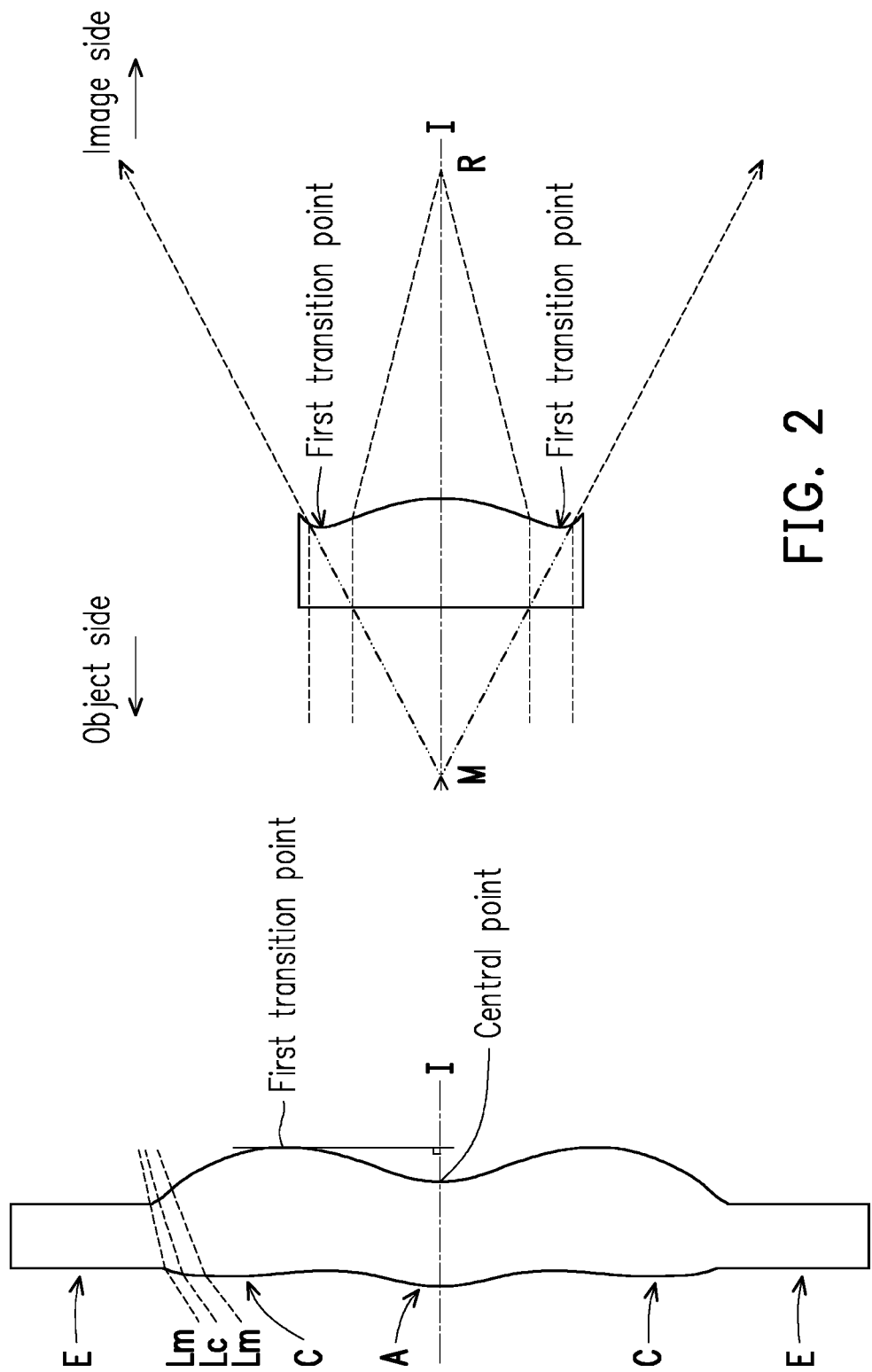

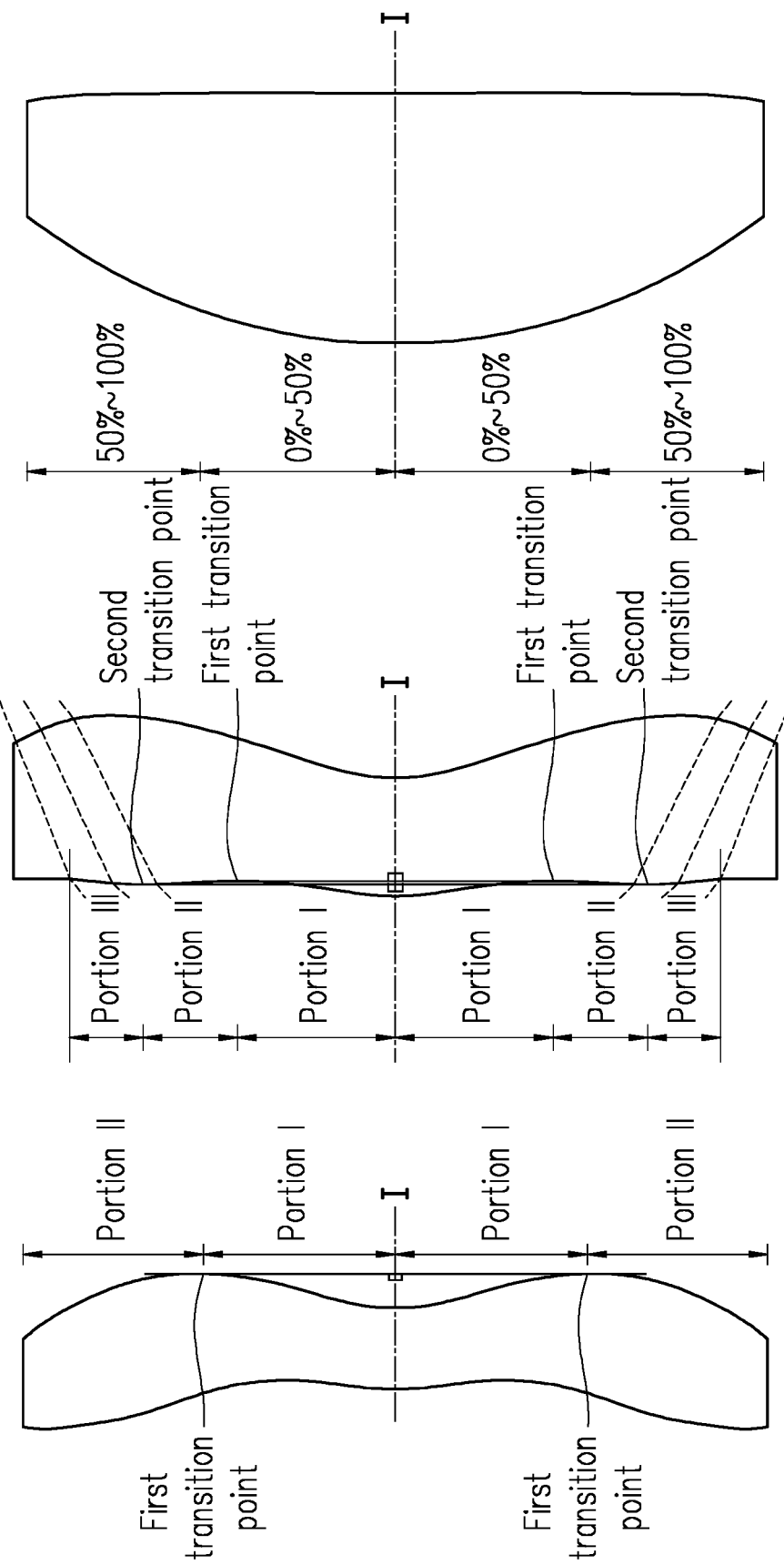

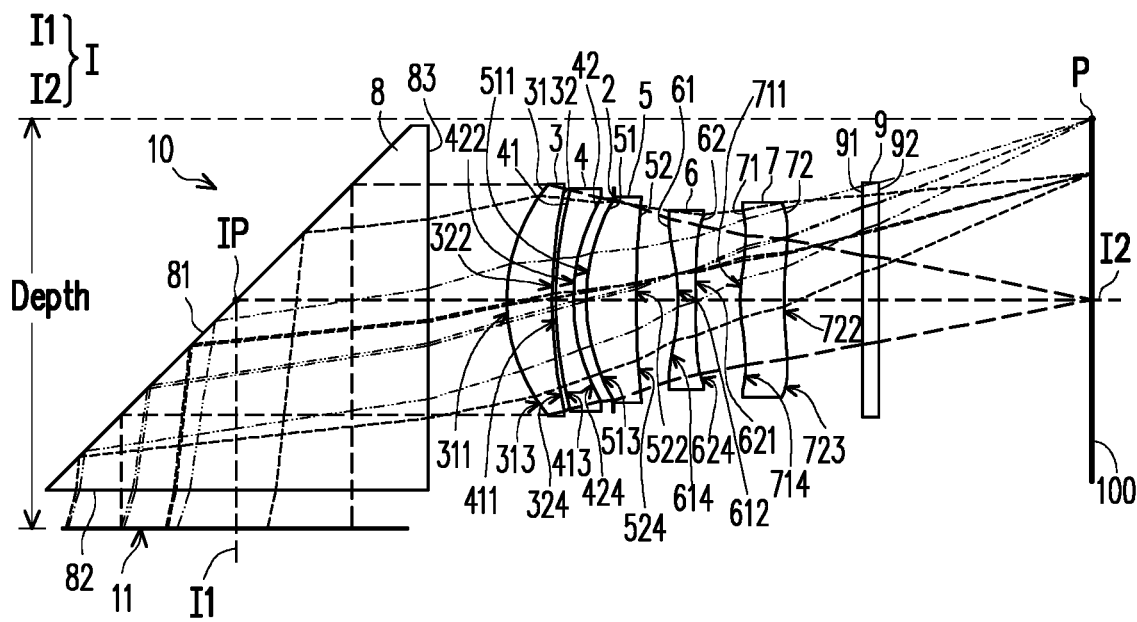
FIG. 6
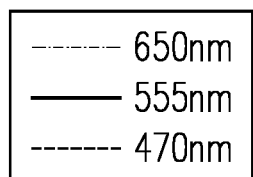
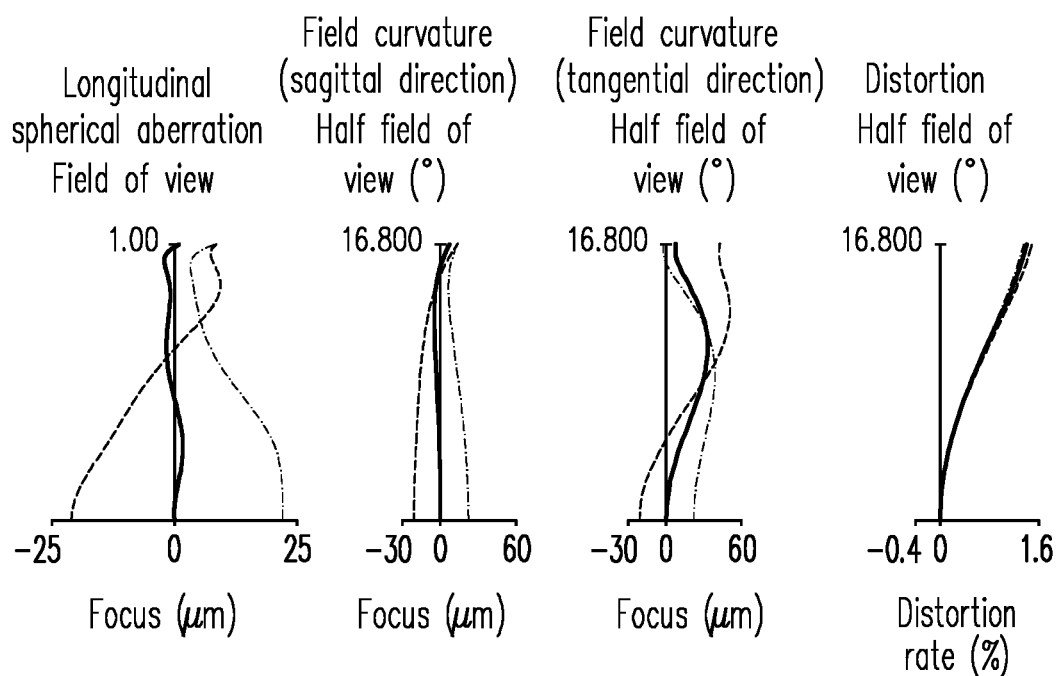
FIG. 7A   FIG. 7B   FIG. 7C   FIG. 7D

| First embodiment |||||||
|---|---|---|---|---|---|---|
| Effective focal length=7.614 mm , Half field of view=16.799°, TTL=7.528 mm, f-number=2.420, Image height=2.331 mm |||||||
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.122 | 0.598 | 1.545 | 55.987 | 5.650 | 1.483 |
| | Image-side surface 32 | 6.111 | 0.045 | | | | 1.433 |
| Second lens element 4 | Object-side surface 41 | 3.875 | 0.228 | 1.642 | 22.409 | -6.775 | 1.412 |
| | Image-side surface 42 | 2.010 | 0.448 | | | | 1.310 |
| Aperture stop 2 | | Infinity | -0.279 | | | | |
| Third lens element 5 | Object-side surface 51 | 2.624 | 0.637 | 1.535 | 55.690 | 5.345 | 1.300 |
| | Image-side surface 52 | 28.187 | 0.531 | | | | 1.231 |
| Fourth lens element 6 | Object-side surface 61 | -2.463 | 0.239 | 1.535 | 55.690 | -4.592 | 1.156 |
| | Image-side surface 62 | -10000.000 | 0.570 | | | | 1.097 |
| Fifth lens element 7 | Object-side surface 71 | 2.739 | 0.556 | 1.642 | 22.409 | 10.544 | 1.151 |
| | Image-side surface 72 | 4.209 | 1.000 | | | | 1.250 |
| Filter 9 | Object-side surface 91 | Infinity | 0.210 | 1.517 | 64.167 | | |
| | Image-side surface 92 | Infinity | 2.744 | | | | |
| | Image plane 100 | Infinity | | | | | |

FIG. 8

| Surface | K | $a_2$ | $a_4$ | $a_6$ | $a_8$ |
|---|---|---|---|---|---|
| 31 | 0.000000E+00 | 0.000000E+00 | -7.368961E-03 | 1.670111E-03 | -2.339981E-03 |
| 32 | 0.000000E+00 | 0.000000E+00 | -2.268940E-03 | -4.527715E-03 | 1.416116E-03 |
| 41 | 0.000000E+00 | 0.000000E+00 | -3.556652E-02 | 5.797843E-03 | 1.422977E-04 |
| 42 | 0.000000E+00 | 0.000000E+00 | -5.897579E-02 | 8.567691E-03 | -2.016658E-03 |
| 51 | 0.000000E+00 | 0.000000E+00 | -3.303296E-03 | 1.099611E-03 | -2.697840E-04 |
| 52 | 0.000000E+00 | 0.000000E+00 | 1.818772E-02 | 8.190877E-03 | -1.651971E-02 |
| 61 | 0.000000E+00 | 0.000000E+00 | 1.357423E-01 | -4.804207E-02 | 1.694531E-02 |
| 62 | 0.000000E+00 | 0.000000E+00 | 3.271810E-02 | 4.759165E-02 | -5.262219E-02 |
| 71 | 0.000000E+00 | 0.000000E+00 | -1.458934E-01 | 3.933880E-02 | -4.341684E-02 |
| 72 | 0.000000E+00 | 0.000000E+00 | -9.088409E-02 | 8.323099E-03 | -6.575419E-03 |
| Surface | $a_{10}$ | $a_{12}$ | $a_{14}$ | | |
| 31 | 7.264488E-04 | -1.755789E-04 | 3.087571E-06 | | |
| 32 | 2.418128E-04 | -9.019004E-05 | 2.877655E-07 | | |
| 41 | 2.539059E-04 | -7.780482E-05 | 1.193948E-05 | | |
| 42 | 8.073546E-04 | -3.660071E-04 | 1.465254E-04 | | |
| 51 | 9.975329E-04 | 3.327300E-05 | 7.249433E-05 | | |
| 52 | 1.089016E-02 | -2.413824E-03 | -3.823217E-05 | | |
| 61 | -6.200352E-03 | 7.482418E-03 | -3.241372E-03 | | |
| 62 | 4.511108E-02 | -1.619230E-02 | 3.991806E-03 | | |
| 71 | 2.609004E-02 | -8.085048E-03 | 9.586704E-04 | | |
| 72 | 3.753820E-03 | -8.055312E-04 | -5.938741E-05 | | |

FIG. 9

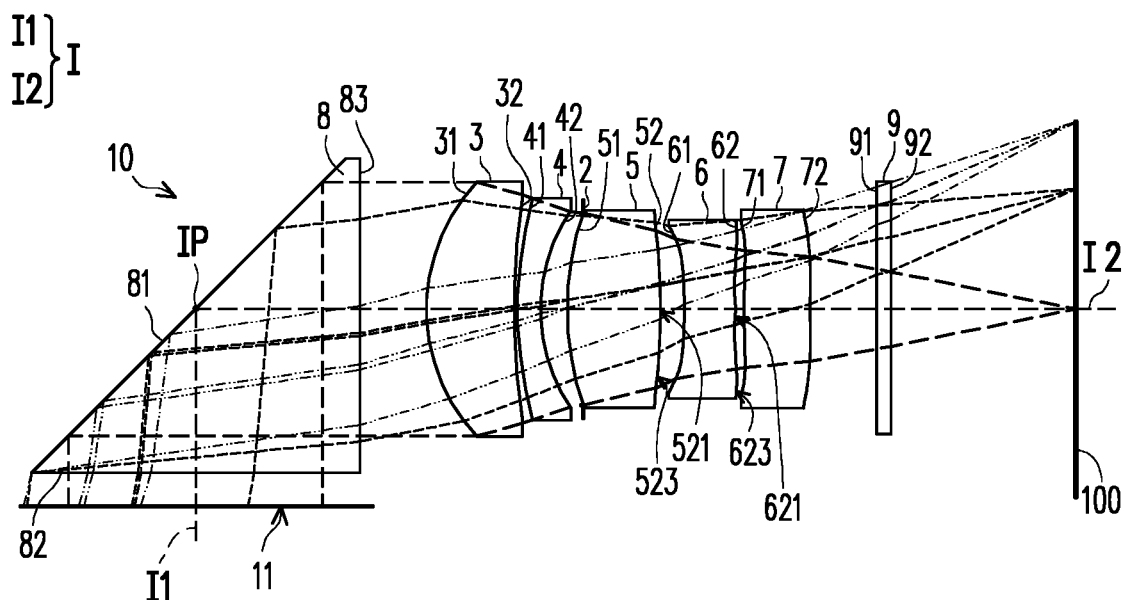
FIG. 10
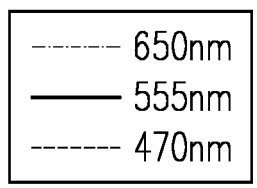
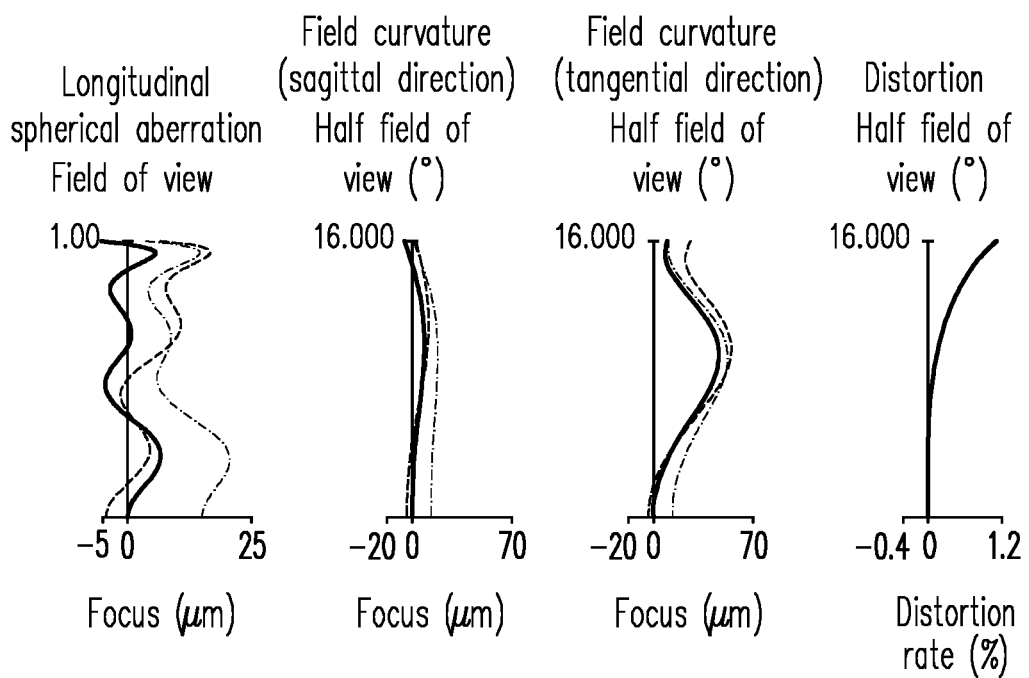
FIG. 11A  FIG. 11B  FIG. 11C  FIG. 11D

| Second embodiment | | | | | | | |
|---|---|---|---|---|---|---|---|
| Effective focal length=9.677 mm, Half field of view=16.000°, TTL=9.721 mm, f-number=2.420, Image height=2.805 mm | | | | | | | |
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.548 | 1.313 | 1.545 | 55.987 | 6.320 | 1.911 |
| | Image-side surface 32 | 7.950 | 0.045 | | | | 1.707 |
| Second lens element 4 | Object-side surface 41 | 3.982 | 0.347 | 1.642 | 22.409 | -6.906 | 1.651 |
| | Image-side surface 42 | 2.034 | 0.613 | | | | 1.477 |
| Aperture stop 2 | | Infinity | -0.200 | | | | |
| Third lens element 5 | Object-side surface 51 | 3.611 | 1.371 | 1.535 | 55.690 | 5.677 | 1.468 |
| | Image-side surface 52 | -16.892 | 0.408 | | | | 1.308 |
| Fourth lens element 6 | Object-side surface 61 | -2.662 | 0.732 | 1.535 | 55.690 | -4.962 | 1.261 |
| | Image-side surface 62 | -10000.000 | 0.137 | | | | 1.371 |
| Fifth lens element 7 | Object-side surface 71 | 9.043 | 0.989 | 1.642 | 22.409 | 16.718 | 1.378 |
| | Image-side surface 72 | 52.669 | 1.000 | | | | 1.539 |
| Filter 9 | Object-side surface 91 | Infinity | 0.210 | 1.517 | 64.167 | | |
| | Image-side surface 92 | Infinity | 2.754 | | | | |
| | Image plane 100 | Infinity | | | | | |

FIG. 12

| Surface | K | $a_2$ | $a_4$ | $a_6$ | $a_8$ |
|---|---|---|---|---|---|
| 31 | 0.000000E+00 | 0.000000E+00 | -3.731036E-03 | 1.372257E-03 | -1.474915E-03 |
| 32 | 0.000000E+00 | 0.000000E+00 | -2.510466E-03 | -4.939698E-03 | 1.129871E-03 |
| 41 | 0.000000E+00 | 0.000000E+00 | -2.979856E-02 | 4.386126E-03 | 2.037434E-04 |
| 42 | 0.000000E+00 | 0.000000E+00 | -5.555147E-02 | 1.034975E-02 | -2.386597E-03 |
| 51 | 0.000000E+00 | 0.000000E+00 | -1.830124E-02 | -2.919803E-04 | -3.221030E-04 |
| 52 | 0.000000E+00 | 0.000000E+00 | 1.629015E-02 | 4.139773E-03 | -1.988133E-02 |
| 61 | 0.000000E+00 | 0.000000E+00 | 1.088462E-01 | -6.107237E-02 | 8.497402E-03 |
| 62 | 0.000000E+00 | 0.000000E+00 | 2.360702E-02 | 3.624144E-02 | -7.045723E-02 |
| 71 | 0.000000E+00 | 0.000000E+00 | -7.941311E-02 | 5.430379E-02 | -4.617962E-02 |
| 72 | 0.000000E+00 | 0.000000E+00 | -3.992145E-02 | 1.250681E-02 | -6.531259E-03 |
| Surface | $a_{10}$ | $a_{12}$ | $a_{14}$ | | |
| 31 | 5.760014E-04 | -1.386918E-04 | 1.300760E-05 | | |
| 32 | 1.922766E-04 | -9.860219E-05 | 1.395550E-05 | | |
| 41 | 1.878064E-04 | -5.942610E-05 | 1.502733E-06 | | |
| 42 | 1.035617E-03 | -2.511943E-04 | 3.567575E-05 | | |
| 51 | 7.981847E-04 | -2.442784E-05 | 4.284412E-05 | | |
| 52 | 8.889403E-03 | -1.598011E-03 | 1.535604E-04 | | |
| 61 | -7.729525E-03 | 4.075678E-03 | -7.989007E-04 | | |
| 62 | 4.383550E-02 | -1.452363E-02 | 2.173290E-03 | | |
| 71 | 2.552128E-02 | -8.680885E-03 | 1.414496E-03 | | |
| 72 | 3.087182E-03 | -8.098695E-04 | 9.151805E-05 | | |

FIG. 13

| Third embodiment | | | | | | | |
|---|---|---|---|---|---|---|---|
| Effective focal length=10.504 mm , Half field of view=15.998°, TTL=12.542 mm, f-number=2.627, Image height=2.795 mm | | | | | | | |
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 3.806 | 2.085 | 1.545 | 55.987 | 9.102 | 2.500 |
| | Image-side surface 32 | 13.078 | 0.050 | | | | 1.802 |
| Second lens element 4 | Object-side surface 41 | 7.363 | 0.259 | 1.642 | 22.409 | -10.230 | 1.766 |
| | Image-side surface 42 | 3.438 | 0.245 | | | | 1.565 |
| Aperture stop 2 | | Infinity | -0.046 | | | | |
| Third lens element 5 | Object-side surface 51 | 6.428 | 3.833 | 1.535 | 55.690 | 4.704 | 1.563 |
| | Image-side surface 52 | -3.291 | 0.059 | | | | 1.542 |
| Fourth lens element 6 | Object-side surface 61 | -3.021 | 1.345 | 1.535 | 55.690 | -5.633 | 1.540 |
| | Image-side surface 62 | -10000.000 | 0.112 | | | | 1.770 |
| Fifth lens element 7 | Object-side surface 71 | 6.322 | 1.130 | 1.642 | 22.409 | -70.367 | 1.715 |
| | Image-side surface 72 | 5.162 | 1.000 | | | | 1.896 |
| Filter 9 | Object-side surface 91 | Infinity | 0.210 | 1.517 | 64.167 | | |
| | Image-side surface 92 | Infinity | 2.259 | | | | |
| | Image plane 100 | Infinity | | | | | |

FIG. 16

| Surface | K | $a_2$ | $a_4$ | $a_6$ | $a_8$ |
|---|---|---|---|---|---|
| 31 | 0.000000E+00 | 0.000000E+00 | -2.438782E-03 | 1.730962E-03 | -1.364788E-03 |
| 32 | 0.000000E+00 | 0.000000E+00 | -4.077779E-03 | -5.015682E-03 | 1.171751E-03 |
| 41 | 0.000000E+00 | 0.000000E+00 | -3.230752E-02 | 3.861701E-03 | 2.367098E-04 |
| 42 | 0.000000E+00 | 0.000000E+00 | -5.150989E-02 | 1.085100E-02 | -2.514520E-03 |
| 51 | 0.000000E+00 | 0.000000E+00 | -2.214786E-02 | 3.043269E-04 | -2.133968E-04 |
| 52 | 0.000000E+00 | 0.000000E+00 | 4.640934E-02 | -1.522827E-03 | -2.396093E-02 |
| 61 | 0.000000E+00 | 0.000000E+00 | 8.847241E-02 | -4.257439E-02 | 8.194555E-03 |
| 62 | 0.000000E+00 | 0.000000E+00 | -1.659855E-02 | 4.423688E-02 | -6.474613E-02 |
| 71 | 0.000000E+00 | 0.000000E+00 | -7.420796E-02 | 3.987348E-02 | -4.128085E-02 |
| 72 | 0.000000E+00 | 0.000000E+00 | -5.908416E-02 | 1.724071E-02 | -7.305647E-03 |

| Surface | $a_{10}$ | $a_{12}$ | $a_{14}$ |
|---|---|---|---|
| 31 | 5.962756E-04 | -1.358295E-04 | 1.212478E-05 |
| 32 | 2.151287E-04 | -9.167995E-05 | 1.836472E-05 |
| 41 | 2.055139E-04 | -5.172200E-05 | 1.730378E-06 |
| 42 | 1.076040E-03 | -2.357208E-04 | 2.816065E-05 |
| 51 | 5.836613E-04 | -1.044227E-04 | 2.456506E-05 |
| 52 | 1.027487E-02 | -1.615299E-03 | 2.503401E-04 |
| 61 | -9.925688E-03 | 5.437519E-03 | -7.445715E-04 |
| 62 | 4.579869E-02 | -1.431539E-02 | 1.554363E-03 |
| 71 | 2.883273E-02 | -8.459530E-03 | 7.902921E-04 |
| 72 | 3.194513E-03 | -7.429313E-04 | 6.403056E-05 |

FIG. 17

| Fourth embodiment | | | | | | | |
|---|---|---|---|---|---|---|---|
| Effective focal length=10.139 mm , Half field of view=15.999°, TTL=8.411 mm, f-number=2.42, Image height=2.808 mm | | | | | | | |
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.333 | 1.386 | 1.545 | 55.987 | 5.540 | 1.943 |
| | Image-side surface 32 | 8.044 | 0.045 | | | | 1.709 |
| Second lens element 4 | Object-side surface 41 | 4.191 | 0.465 | 1.642 | 22.409 | -6.636 | 1.638 |
| | Image-side surface 42 | 2.029 | 0.656 | | | | 1.400 |
| Aperture stop 2 | | Infinity | -0.313 | | | | |
| Third lens element 5 | Object-side surface 51 | 2.707 | 0.505 | 1.535 | 55.690 | 5.294 | 1.383 |
| | Image-side surface 52 | 54.029 | 0.603 | | | | 1.349 |
| Fourth lens element 6 | Object-side surface 61 | -3.024 | 0.275 | 1.535 | 55.690 | -5.637 | 1.150 |
| | Image-side surface 62 | -10000.000 | 1.601 | | | | 1.137 |
| Fifth lens element 7 | Object-side surface 71 | -6.330 | 1.143 | 1.642 | 22.409 | -12.452 | 1.498 |
| | Image-side surface 72 | -31.564 | 1.000 | | | | 1.952 |
| Filter 9 | Object-side surface 91 | Infinity | 0.210 | 1.517 | 64.167 | | |
| | Image-side surface 92 | Infinity | 0.836 | | | | |
| | Image plane 100 | Infinity | | | | | |

FIG. 20

| Surface | K | $a_2$ | $a_4$ | $a_6$ | $a_8$ |
|---|---|---|---|---|---|
| 31 | 0.000000E+00 | 0.000000E+00 | -4.154439E-03 | 1.423485E-03 | -1.493418E-03 |
| 32 | 0.000000E+00 | 0.000000E+00 | -4.135985E-03 | -4.937403E-03 | 1.246800E-03 |
| 41 | 0.000000E+00 | 0.000000E+00 | -2.990314E-02 | 4.237667E-03 | 1.486355E-04 |
| 42 | 0.000000E+00 | 0.000000E+00 | -5.576129E-02 | 1.121522E-02 | -1.624705E-03 |
| 51 | 0.000000E+00 | 0.000000E+00 | -1.283356E-02 | -4.411221E-04 | -4.459379E-04 |
| 52 | 0.000000E+00 | 0.000000E+00 | 1.499778E-02 | 5.759336E-03 | -2.200045E-02 |
| 61 | 0.000000E+00 | 0.000000E+00 | 9.150112E-02 | -6.724252E-02 | 7.772695E-03 |
| 62 | 0.000000E+00 | 0.000000E+00 | 5.277136E-02 | 3.578997E-02 | -7.741840E-02 |
| 71 | 0.000000E+00 | 0.000000E+00 | -7.848871E-02 | 4.999117E-02 | -4.408246E-02 |
| 72 | 0.000000E+00 | 0.000000E+00 | -5.105242E-02 | 1.213160E-02 | -6.832565E-03 |
| Surface | $a_{10}$ | $a_{12}$ | $a_{14}$ | | |
| 31 | 5.698512E-04 | -1.394313E-04 | 1.314850E-05 | | |
| 32 | 2.023356E-04 | -1.050920E-04 | 1.462436E-05 | | |
| 41 | 1.546883E-04 | -6.962259E-05 | 2.645547E-07 | | |
| 42 | 9.353241E-04 | -1.984090E-04 | 3.713576E-05 | | |
| 51 | 8.445225E-04 | 2.491459E-05 | 5.464843E-05 | | |
| 52 | 8.993841E-03 | -2.268095E-03 | 4.535829E-04 | | |
| 61 | -7.141400E-03 | 3.587369E-03 | 7.262432E-04 | | |
| 62 | 4.527930E-02 | -9.275736E-03 | 2.378297E-03 | | |
| 71 | 2.527944E-02 | -8.670551E-03 | 1.423694E-03 | | |
| 72 | 3.270981E-03 | -8.445932E-04 | 8.469180E-05 | | |

FIG. 21

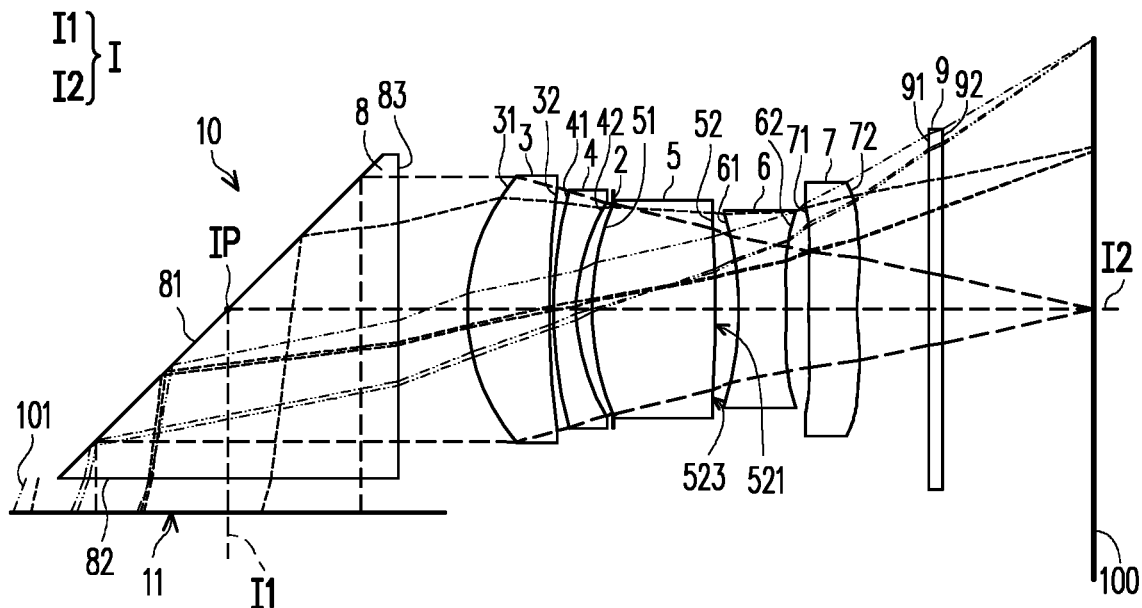
FIG. 22
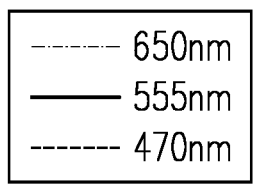
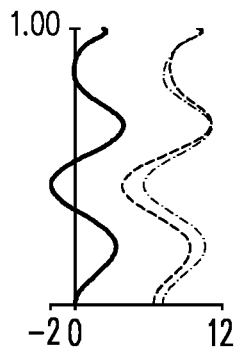
Longitudinal
spherical aberration
Field of view
FIG. 23A
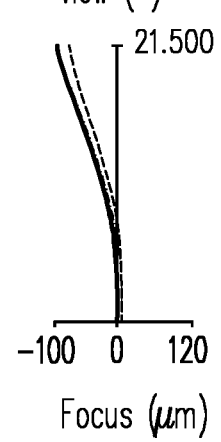
Field curvature
(sagittal direction)
Half field of
view (°)
FIG. 23B
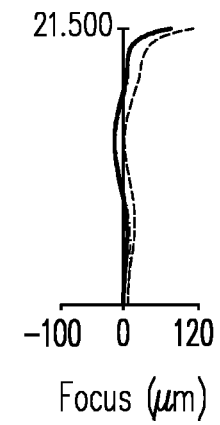
Field curvature
(tangential direction)
Half field of
view (°)
FIG. 23C
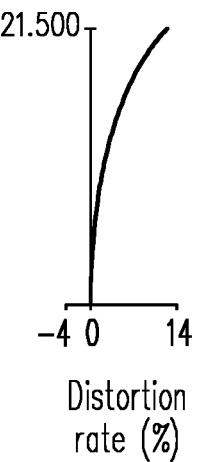
Distortion
Half field of
view (°)
FIG. 23D

| Fifth embodiment | | | | | | | |
|---|---|---|---|---|---|---|---|
| Effective focal length=8.807 mm , Half field of view=21.501°, TTL=9.048 mm, f-number=2.203, Image height=3.903 mm | | | | | | | |
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.762 | 1.189 | 1.545 | 55.987 | 6.762 | 1.966 |
| | Image-side surface 32 | 9.280 | 0.057 | | | | 1.778 |
| Second lens element 4 | Object-side surface 41 | 4.347 | 0.328 | 1.642 | 22.409 | -7.298 | 1.723 |
| | Image-side surface 42 | 2.197 | 0.511 | | | | 1.563 |
| Aperture stop 2 | | Infinity | -0.285 | | | | |
| Third lens element 5 | Object-side surface 51 | 3.184 | 1.786 | 1.535 | 55.690 | 4.855 | 1.568 |
| | Image-side surface 52 | -11.529 | 0.348 | | | | 1.436 |
| Fourth lens element 6 | Object-side surface 61 | -2.669 | 0.667 | 1.535 | 55.690 | -4.975 | 1.431 |
| | Image-side surface 62 | -10000.000 | 0.338 | | | | 1.532 |
| Fifth lens element 7 | Object-side surface 71 | 9.986 | 0.728 | 1.642 | 22.409 | 28.933 | 1.673 |
| | Image-side surface 72 | 20.780 | 1.000 | | | | 1.866 |
| Filter 9 | Object-side surface 91 | Infinity | 0.210 | 1.517 | 64.167 | | |
| | Image-side surface 92 | Infinity | 2.171 | | | | |
| | Image plane 100 | Infinity | | | | | |

FIG. 24

| Surface | K | $a_2$ | $a_4$ | $a_6$ | $a_8$ |
|---|---|---|---|---|---|
| 31 | 0.000000E+00 | 0.000000E+00 | -2.675538E-03 | 1.417334E-03 | -1.425219E-03 |
| 32 | 0.000000E+00 | 0.000000E+00 | -1.951199E-03 | -4.883428E-03 | 1.101449E-03 |
| 41 | 0.000000E+00 | 0.000000E+00 | -3.047484E-02 | 4.206194E-03 | 2.162201E-04 |
| 42 | 0.000000E+00 | 0.000000E+00 | -5.535094E-02 | 1.026181E-02 | -2.463415E-03 |
| 51 | 0.000000E+00 | 0.000000E+00 | -1.944471E-02 | -4.503305E-04 | -3.054217E-04 |
| 52 | 0.000000E+00 | 0.000000E+00 | 2.290396E-02 | 6.610505E-03 | -1.647764E-02 |
| 61 | 0.000000E+00 | 0.000000E+00 | 1.140634E-01 | -4.361302E-02 | 9.975432E-03 |
| 62 | 0.000000E+00 | 0.000000E+00 | 4.086471E-02 | 4.188416E-02 | -6.753450E-02 |
| 71 | 0.000000E+00 | 0.000000E+00 | -6.311240E-02 | 5.082663E-02 | -4.501056E-02 |
| 72 | 0.000000E+00 | 0.000000E+00 | -3.591471E-02 | 1.359680E-02 | -7.735773E-03 |
| Surface | $a_{10}$ | $a_{12}$ | $a_{14}$ | | |
| 31 | 5.804413E-04 | -1.385320E-04 | 1.297158E-05 | | |
| 32 | 1.886984E-04 | -9.894177E-05 | 1.390297E-05 | | |
| 41 | 1.845627E-04 | -5.567423E-05 | 4.717857E-06 | | |
| 42 | 1.134150E-03 | -2.139695E-04 | 3.001539E-05 | | |
| 51 | 6.661682E-04 | -7.809261E-05 | 2.809727E-05 | | |
| 52 | 9.209824E-03 | -3.161964E-03 | 6.111169E-04 | | |
| 61 | -8.444148E-03 | 4.363354E-03 | -7.018235E-04 | | |
| 62 | 4.385944E-02 | -1.503885E-02 | 2.226829E-03 | | |
| 71 | 2.613716E-02 | -8.885400E-03 | 1.306811E-03 | | |
| 72 | 3.040598E-03 | -7.090196E-04 | 7.072050E-05 | | |

FIG. 25

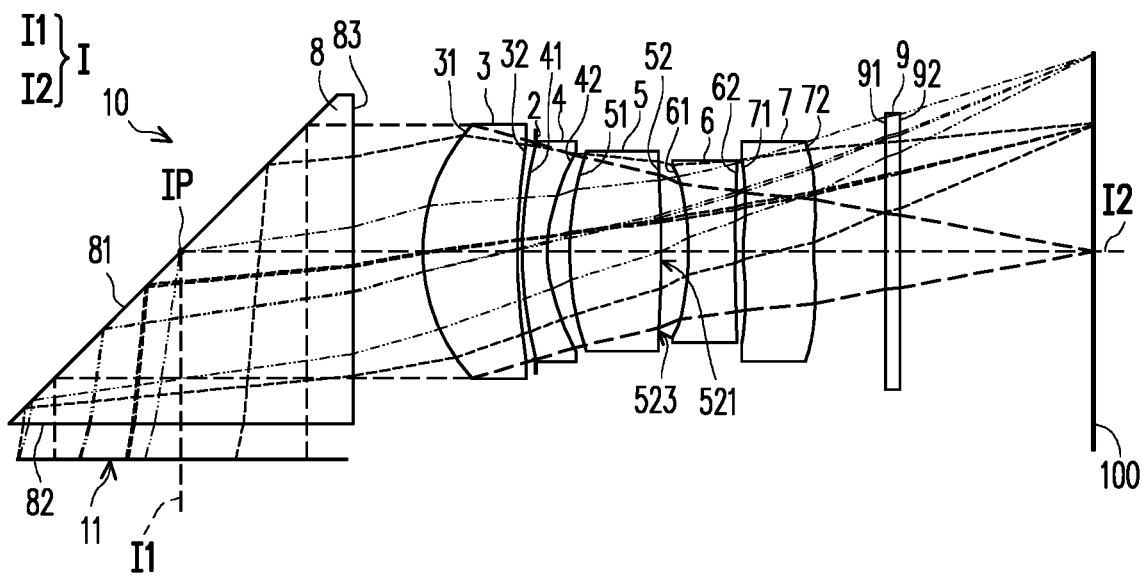
FIG. 26
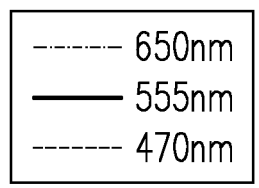
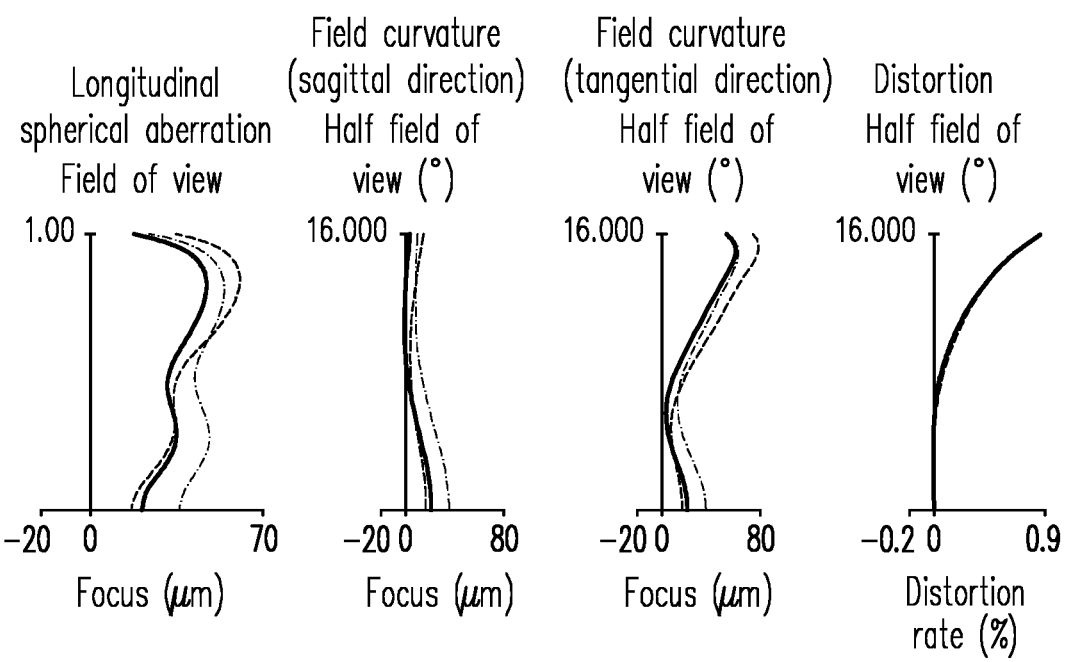
FIG. 27A  FIG. 27B  FIG. 27C  FIG. 27D

| Sixth embodiment |||||||
|---|---|---|---|---|---|---|---|
| Effective focal length=9.712 mm , Half field of view=15.998°, TTL=9.540 mm, f-number=2.420, Image height=2.8 mm |||||||
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.505 | 1.349 | 1.545 | 55.987 | 6.154 | 1.809 |
| | Image-side surface 32 | 7.960 | 0.251 | | | | 1.624 |
| Aperture stop 2 | | Infinity | -0.186 | | | | |
| Second lens element 4 | Object-side surface 41 | 4.125 | 0.348 | 1.642 | 22.409 | -6.736 | 1.575 |
| | Image-side surface 42 | 2.049 | 0.322 | | | | 1.425 |
| Third lens element 5 | Object-side surface 51 | 3.535 | 1.310 | 1.535 | 55.690 | 5.810 | 1.425 |
| | Image-side surface 52 | -22.959 | 0.400 | | | | 1.296 |
| Fourth lens element 6 | Object-side surface 61 | -2.707 | 0.648 | 1.535 | 55.690 | -5.046 | 1.248 |
| | Image-side surface 62 | -10000.000 | 0.139 | | | | 1.342 |
| Fifth lens element 7 | Object-side surface 71 | 10.035 | 1.005 | 1.642 | 22.409 | 18.001 | 1.349 |
| | Image-side surface 72 | 69.453 | 1.000 | | | | 1.625 |
| Filter 9 | Object-side surface 91 | Infinity | 0.210 | 1.517 | 64.167 | | |
| | Image-side surface 92 | Infinity | 2.743 | | | | |
| | Image plane 100 | Infinity | | | | | |

FIG. 28

| Surface | K | $a_2$ | $a_4$ | $a_6$ | $a_8$ |
|---|---|---|---|---|---|
| 31 | 0.000000E+00 | 0.000000E+00 | -3.849385E-03 | 1.383838E-03 | -1.483394E-03 |
| 32 | 0.000000E+00 | 0.000000E+00 | -3.414348E-03 | -5.005281E-03 | 1.211528E-03 |
| 41 | 0.000000E+00 | 0.000000E+00 | -2.973118E-02 | 4.430567E-03 | 2.351958E-04 |
| 42 | 0.000000E+00 | 0.000000E+00 | -5.437962E-02 | 9.928414E-03 | -2.100153E-03 |
| 51 | 0.000000E+00 | 0.000000E+00 | -1.821499E-02 | -2.654017E-04 | -2.767423E-04 |
| 52 | 0.000000E+00 | 0.000000E+00 | 1.547580E-02 | 5.506927E-03 | -2.144914E-02 |
| 61 | 0.000000E+00 | 0.000000E+00 | 1.077775E-01 | -6.208373E-02 | 7.473156E-03 |
| 62 | 0.000000E+00 | 0.000000E+00 | 2.551533E-02 | 3.653569E-02 | -7.030487E-02 |
| 71 | 0.000000E+00 | 0.000000E+00 | -8.036656E-02 | 5.352643E-02 | -4.538728E-02 |
| 72 | 0.000000E+00 | 0.000000E+00 | -4.036102E-02 | 1.219144E-02 | -6.684507E-03 |
| Surface | $a_{10}$ | $a_{12}$ | $a_{14}$ | | |
| 31 | 5.724507E-04 | -1.387719E-04 | 1.300388E-05 | | |
| 32 | 1.947681E-04 | -1.057503E-04 | 1.483325E-05 | | |
| 41 | 1.791676E-04 | -6.363706E-05 | 1.529455E-06 | | |
| 42 | 8.670856E-04 | -1.946318E-04 | 3.539841E-05 | | |
| 51 | 8.218478E-04 | -1.289495E-06 | 5.142314E-05 | | |
| 52 | 9.829076E-03 | -2.007216E-03 | 2.105586E-04 | | |
| 61 | -7.406702E-03 | 4.116988E-03 | -9.248697E-04 | | |
| 62 | 4.405665E-02 | -1.444431E-02 | 2.170429E-03 | | |
| 71 | 2.518384E-02 | -8.551933E-03 | 1.409724E-03 | | |
| 72 | 3.136308E-03 | -8.501548E-04 | 9.833518E-05 | | |

FIG. 29

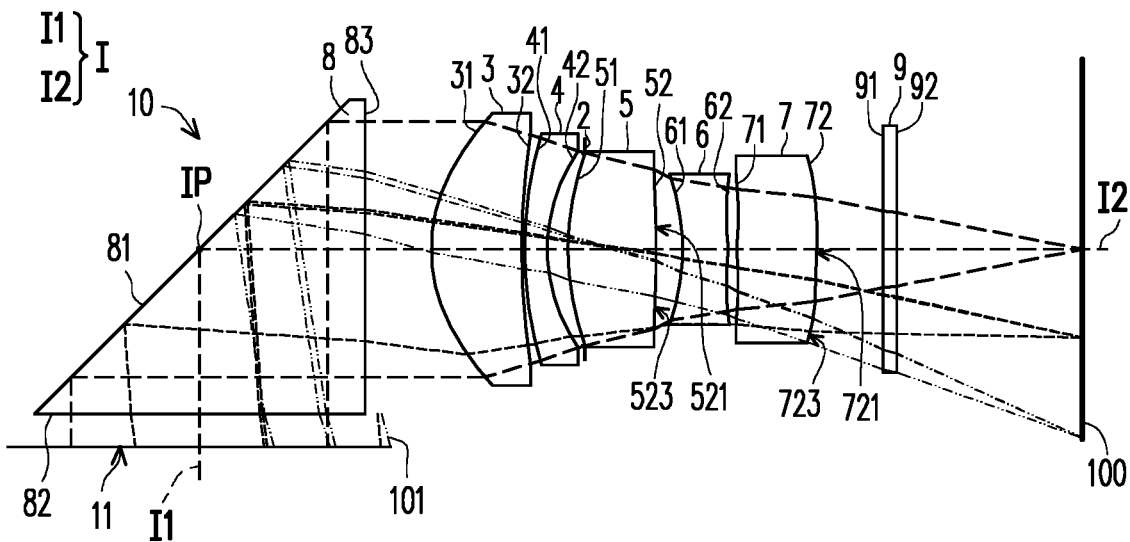
FIG. 30
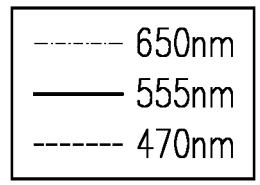
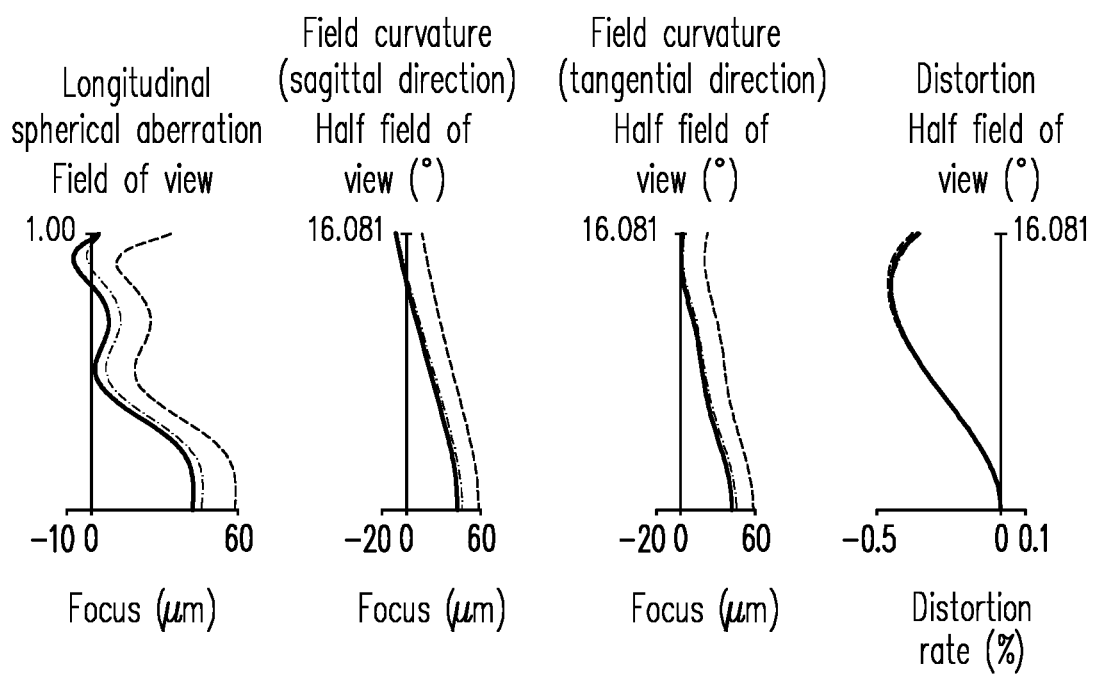
FIG. 31A  FIG. 31B  FIG. 31C  FIG. 31D

| Seventh embodiment | | | | | | | |
|---|---|---|---|---|---|---|---|
| Effective focal length=9.864 mm , Half field of view=16.08°, TTL=9.654 mm, f-number=2.420, Image height=2.815 mm | | | | | | | |
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.503 | 1.336 | 1.545 | 55.987 | 6.160 | 1.919 |
| | Image-side surface 32 | 7.933 | 0.045 | | | | 1.718 |
| Second lens element 4 | Object-side surface 41 | 4.145 | 0.344 | 1.642 | 22.409 | -6.749 | 1.660 |
| | Image-side surface 42 | 2.058 | 0.566 | | | | 1.473 |
| Aperture stop 2 | | Infinity | -0.261 | | | | |
| Third lens element 5 | Object-side surface 51 | 3.532 | 1.299 | 1.535 | 55.690 | 5.757 | 1.459 |
| | Image-side surface 52 | -21.440 | 0.394 | | | | 1.304 |
| Fourth lens element 6 | Object-side surface 61 | -2.697 | 0.667 | 1.535 | 55.690 | -5.028 | 1.250 |
| | Image-side surface 62 | -10000.000 | 0.153 | | | | 1.335 |
| Fifth lens element 7 | Object-side surface 71 | 10.356 | 1.158 | 1.544 | 49.922 | 18.679 | 1.341 |
| | Image-side surface 72 | -682.199 | 1.000 | | | | 1.585 |
| Filter 9 | Object-side surface 91 | Infinity | 0.210 | 1.517 | 64.167 | | |
| | Image-side surface 92 | Infinity | 2.743 | | | | |
| | Image plane 100 | Infinity | | | | | |

FIG. 32

| Surface | K | $a_2$ | $a_4$ | $a_6$ | $a_8$ |
|---|---|---|---|---|---|
| 31 | 0.000000E+00 | 0.000000E+00 | -3.773300E-03 | 1.391916E-03 | -1.483472E-03 |
| 32 | 0.000000E+00 | 0.000000E+00 | -3.409159E-03 | -4.999167E-03 | 1.211752E-03 |
| 41 | 0.000000E+00 | 0.000000E+00 | -2.960990E-02 | 4.440084E-03 | 2.362026E-04 |
| 42 | 0.000000E+00 | 0.000000E+00 | -5.459937E-02 | 9.932846E-03 | -2.083509E-03 |
| 51 | 0.000000E+00 | 0.000000E+00 | -1.812849E-02 | -2.808480E-04 | -2.711597E-04 |
| 52 | 0.000000E+00 | 0.000000E+00 | 1.633751E-02 | 5.590082E-03 | -2.149065E-02 |
| 61 | 0.000000E+00 | 0.000000E+00 | 1.071148E-01 | -6.160058E-02 | 7.934482E-03 |
| 62 | 0.000000E+00 | 0.000000E+00 | 2.658380E-02 | 3.713957E-02 | -6.997053E-02 |
| 71 | 0.000000E+00 | 0.000000E+00 | -8.101859E-02 | 5.309042E-02 | -4.560124E-02 |
| 72 | 0.000000E+00 | 0.000000E+00 | -4.055631E-02 | 1.199844E-02 | -6.812577E-03 |

| Surface | $a_{10}$ | $a_{12}$ | $a_{14}$ | | |
|---|---|---|---|---|---|
| 31 | 5.720470E-04 | -1.390061E-04 | 1.288551E-05 | | |
| 32 | 1.945150E-04 | -1.056331E-04 | 1.517745E-05 | | |
| 41 | 1.807785E-04 | -6.312439E-05 | 1.230982E-06 | | |
| 42 | 8.704899E-04 | -1.944586E-04 | 3.588581E-05 | | |
| 51 | 8.346060E-04 | -2.279369E-06 | 5.286082E-05 | | |
| 52 | 9.827979E-03 | -1.978896E-03 | 2.072847E-04 | | |
| 61 | -7.170632E-03 | 4.183134E-03 | -9.541219E-04 | | |
| 62 | 4.423102E-02 | -1.439406E-02 | 2.125765E-03 | | |
| 71 | 2.509183E-02 | -8.578855E-03 | 1.420366E-03 | | |
| 72 | 3.086522E-03 | -8.595625E-04 | 1.045015E-04 | | |

FIG. 33

| Eighth embodiment | | | | | | | |
|---|---|---|---|---|---|---|---|
| Effective focal length=9.940 mm , Half field of view=16.091°, TTL=9.711 mm, f-number=2.420, Image height=2.813 mm | | | | | | | |
| Lens element | Surface | Radius of curvature (mm) | Thickness (mm) | Index of refraction | Abbe number | Focal length (mm) | Semi-diameter (mm) |
| Light inlet 11 | | Infinity | -0.500 | | | | |
| Reflector 8 | Light-entering surface 82 | Infinity | -2.450 | | | | |
| | Reflective surface 81 | Infinity | 2.450 | | | | |
| | Light-emitting surface 83 | Infinity | 0.992 | | | | |
| First lens element 3 | Object-side surface 31 | 2.495 | 1.345 | 1.545 | 55.987 | 6.149 | 1.921 |
| | Image-side surface 32 | 7.849 | 0.045 | | | | 1.723 |
| Second lens element 4 | Object-side surface 41 | 4.030 | 0.365 | 1.642 | 22.409 | -7.144 | 1.668 |
| | Image-side surface 42 | 2.077 | 0.551 | | | | 1.494 |
| Aperture stop 2 | | Infinity | -0.243 | | | | |
| Third lens element 5 | Object-side surface 51 | 3.470 | 1.271 | 1.535 | 55.690 | 5.880 | 1.477 |
| | Image-side surface 52 | -30.306 | 0.388 | | | | 1.276 |
| Fourth lens element 6 | Object-side surface 61 | -2.684 | 0.676 | 1.607 | 26.647 | -4.392 | 1.222 |
| | Image-side surface 62 | -10000.000 | 0.184 | | | | 1.328 |
| Fifth lens element 7 | Object-side surface 71 | 9.906 | 1.176 | 1.642 | 22.409 | 14.059 | 1.344 |
| | Image-side surface 72 | -106.748 | 1.000 | | | | 1.610 |
| Filter 9 | Object-side surface 91 | Infinity | 0.210 | 1.517 | 64.167 | | |
| | Image-side surface 92 | Infinity | 2.743 | | | | |
| | Image plane 100 | Infinity | | | | | |

FIG. 36

| Surface | K | $a_2$ | $a_4$ | $a_6$ | $a_8$ |
|---|---|---|---|---|---|
| 31 | 0.000000E+00 | 0.000000E+00 | -3.556576E-03 | 1.313739E-03 | -1.500903E-03 |
| 32 | 0.000000E+00 | 0.000000E+00 | -2.878492E-03 | -4.904413E-03 | 1.206414E-03 |
| 41 | 0.000000E+00 | 0.000000E+00 | -2.922027E-02 | 4.513856E-03 | 2.727784E-04 |
| 42 | 0.000000E+00 | 0.000000E+00 | -5.622036E-02 | 9.601049E-03 | -2.205522E-03 |
| 51 | 0.000000E+00 | 0.000000E+00 | -1.920144E-02 | -6.328094E-04 | -3.646428E-04 |
| 52 | 0.000000E+00 | 0.000000E+00 | 1.993195E-02 | 6.128666E-03 | -2.168130E-02 |
| 61 | 0.000000E+00 | 0.000000E+00 | 1.064528E-01 | -6.137881E-02 | 8.251879E-03 |
| 62 | 0.000000E+00 | 0.000000E+00 | 2.659140E-02 | 3.741985E-02 | -6.948027E-02 |
| 71 | 0.000000E+00 | 0.000000E+00 | -8.028146E-02 | 5.364458E-02 | -4.533798E-02 |
| 72 | 0.000000E+00 | 0.000000E+00 | -4.090600E-02 | 1.195837E-02 | -6.859137E-03 |
| Surface | $a_{10}$ | $a_{12}$ | $a_{14}$ | | |
| 31 | 5.699698E-04 | -1.392381E-04 | 1.277325E-05 | | |
| 32 | 1.878664E-04 | -1.069502E-04 | 1.564954E-05 | | |
| 41 | 1.946897E-04 | -5.983446E-05 | 1.170201E-06 | | |
| 42 | 8.196563E-04 | -2.127008E-04 | 3.176671E-05 | | |
| 51 | 8.007252E-04 | -2.252682E-05 | 3.794443E-05 | | |
| 52 | 9.592841E-03 | -2.127729E-03 | 1.373667E-04 | | |
| 61 | -7.130255E-03 | 3.938865E-03 | -1.380221E-03 | | |
| 62 | 4.475054E-02 | -1.418011E-02 | 1.816573E-03 | | |
| 71 | 2.508725E-02 | -8.622610E-03 | 1.516182E-03 | | |
| 72 | 3.064985E-03 | -8.618995E-04 | 1.090869E-04 | | |

FIG. 37

| Conditional expression | First Embodiment | Second Embodiment | Third Embodiment | Fourth Embodiment |
|---|---|---|---|---|
| T1 | 0.598 | 1.313 | 2.085 | 1.386 |
| G12 | 0.045 | 0.045 | 0.050 | 0.045 |
| T2 | 0.228 | 0.347 | 0.259 | 0.465 |
| G23 | 0.169 | 0.414 | 0.200 | 0.343 |
| T3 | 0.637 | 1.371 | 3.833 | 0.505 |
| G34 | 0.531 | 0.408 | 0.059 | 0.603 |
| T4 | 0.239 | 0.732 | 1.345 | 0.275 |
| G45 | 0.570 | 0.137 | 0.112 | 1.601 |
| T5 | 0.556 | 0.989 | 1.130 | 1.143 |
| G5F | 1.000 | 1.000 | 1.000 | 1.000 |
| TF | 0.210 | 0.210 | 0.210 | 0.210 |
| GFP | 2.744 | 2.754 | 2.259 | 0.836 |
| ν1 | 55.987 | 55.987 | 55.987 | 55.987 |
| ν2 | 22.409 | 22.409 | 22.409 | 22.409 |
| ν3 | 55.690 | 55.690 | 55.690 | 55.690 |
| ν4 | 55.690 | 55.690 | 55.690 | 55.690 |
| ν5 | 22.409 | 22.409 | 22.409 | 22.409 |
| AAG | 1.315 | 1.004 | 0.421 | 2.591 |
| ALT | 2.259 | 4.753 | 8.652 | 3.774 |
| BFL | 3.954 | 3.964 | 3.469 | 2.046 |
| TTL | 7.528 | 9.721 | 12.542 | 8.411 |
| TL | 3.574 | 5.757 | 9.073 | 6.366 |
| EFL | 7.614 | 9.677 | 10.504 | 10.139 |

FIG. 38

| Conditional expression | First Embodiment | Second Embodiment | Third Embodiment | Fourth Embodiment |
|---|---|---|---|---|
| ImgH | 2.331 | 2.805 | 2.795 | 2.808 |
| Fno | 2.420 | 2.420 | 2.627 | 2.420 |
| OP1 | 2.950 | 2.950 | 2.950 | 2.950 |
| OP2 | 10.970 | 13.163 | 15.984 | 11.853 |
| Depth | 5.281 | 5.755 | 5.745 | 5.758 |
| (OP1/ImgH)×Fno | 3.063 | 2.545 | 2.773 | 2.542 |
| OP2/EFL | 1.441 | 1.360 | 1.522 | 1.169 |
| OP2/OP1 | 3.719 | 4.462 | 5.418 | 4.018 |
| $|v5-v2|$ | 0.000 | 0.000 | 0.000 | 0.000 |
| TL/BFL | 0.904 | 1.452 | 2.615 | 3.112 |
| ALT/(T4+T5) | 2.840 | 2.762 | 3.496 | 2.663 |
| (G23+T3+G34)/(T1+G12+T2) | 1.533 | 1.286 | 1.709 | 0.765 |
| TTL/(T1+T2+T3) | 5.144 | 3.206 | 2.030 | 3.569 |
| AAG/(G12+G45) | 2.139 | 5.502 | 2.588 | 1.574 |
| OP2/ALT | 4.857 | 2.769 | 1.848 | 3.141 |
| TTL/OP1 | 2.552 | 3.295 | 4.252 | 2.851 |
| $|v4-v3|$ | 0.000 | 0.000 | 0.000 | 0.000 |
| ALT/BFL | 0.571 | 1.199 | 2.494 | 1.845 |
| TL/(T4+T5) | 4.493 | 3.345 | 3.666 | 4.491 |
| (G23+T3+G34)/(T4+G45+T5) | 0.979 | 1.180 | 1.582 | 0.481 |
| TTL/EFL | 0.989 | 1.005 | 1.194 | 0.830 |
| TL/(T1+G12+T2) | 4.099 | 3.375 | 3.790 | 3.357 |
| (G23+T3+G34)/(T4+T5) | 1.681 | 1.274 | 1.654 | 1.024 |

FIG. 39

| Conditional expression | Fifth Embodiment | Sixth Embodiment | Seventh Embodiment | Eighth Embodiment |
|---|---|---|---|---|
| T1 | 1.189 | 1.349 | 1.336 | 1.345 |
| G12 | 0.057 | 0.065 | 0.045 | 0.045 |
| T2 | 0.328 | 0.348 | 0.344 | 0.365 |
| G23 | 0.226 | 0.322 | 0.305 | 0.308 |
| T3 | 1.786 | 1.310 | 1.299 | 1.271 |
| G34 | 0.348 | 0.400 | 0.394 | 0.388 |
| T4 | 0.667 | 0.648 | 0.667 | 0.676 |
| G45 | 0.338 | 0.139 | 0.153 | 0.184 |
| T5 | 0.728 | 1.005 | 1.158 | 1.176 |
| G5F | 1.000 | 1.000 | 1.000 | 1.000 |
| TF | 0.210 | 0.210 | 0.210 | 0.210 |
| GFP | 2.171 | 2.743 | 2.743 | 2.743 |
| v1 | 55.987 | 55.987 | 55.987 | 55.987 |
| v2 | 22.409 | 22.409 | 22.409 | 22.409 |
| v3 | 55.690 | 55.690 | 55.690 | 55.690 |
| v4 | 55.690 | 55.690 | 55.690 | 26.647 |
| v5 | 22.409 | 22.409 | 49.922 | 22.409 |
| AAG | 0.969 | 0.926 | 0.897 | 0.926 |
| ALT | 4.699 | 4.660 | 4.803 | 4.831 |
| BFL | 3.381 | 3.953 | 3.953 | 3.953 |
| TTL | 9.048 | 9.540 | 9.654 | 9.711 |
| TL | 5.668 | 5.586 | 5.700 | 5.757 |
| EFL | 8.807 | 9.712 | 9.864 | 9.940 |

FIG. 40

| Conditional expression | Fifth Embodiment | Sixth Embodiment | Seventh Embodiment | Eighth Embodiment |
|---|---|---|---|---|
| ImgH | 3.903 | 2.800 | 2.815 | 2.813 |
| Fno | 2.203 | 2.420 | 2.420 | 2.420 |
| OP1 | 2.950 | 2.950 | 2.950 | 2.950 |
| OP2 | 12.490 | 12.982 | 13.096 | 13.153 |
| Depth | 6.853 | 5.750 | 5.765 | 5.763 |
| (OP1/ImgH)×Fno | 1.665 | 2.550 | 2.536 | 2.538 |
| OP2/EFL | 1.418 | 1.337 | 1.328 | 1.323 |
| OP2/OP1 | 4.234 | 4.401 | 4.439 | 4.459 |
| $|v5-v2|$ | 0.000 | 0.000 | 27.514 | 0.000 |
| TL/BFL | 1.676 | 1.413 | 1.442 | 1.456 |
| ALT/(T4+T5) | 3.367 | 2.818 | 2.633 | 2.610 |
| (G23+T3+G34)/(T1+G12+T2) | 1.498 | 1.154 | 1.158 | 1.121 |
| TTL/(T1+T2+T3) | 2.739 | 3.173 | 3.241 | 3.259 |
| AAG/(G12+G45) | 2.452 | 4.541 | 4.528 | 4.035 |
| OP2/ALT | 2.658 | 2.786 | 2.726 | 2.722 |
| TTL/OP1 | 3.067 | 3.234 | 3.272 | 3.292 |
| $|v4-v3|$ | 0.000 | 0.000 | 0.000 | 29.043 |
| ALT/BFL | 1.390 | 1.179 | 1.215 | 1.222 |
| TL/(T4+T5) | 4.062 | 3.379 | 3.124 | 3.110 |
| (G23+T3+G34)/(T4+G45+T5) | 1.361 | 1.134 | 1.010 | 0.966 |
| TTL/EFL | 1.027 | 0.982 | 0.979 | 0.977 |
| TL/(T1+G12+T2) | 3.599 | 3.172 | 3.305 | 3.281 |
| (G23+T3+G34)/(T4+T5) | 1.691 | 1.229 | 1.095 | 1.062 |

FIG. 41

OPTICAL IMAGING SYSTEM

CROSS-REFERENCE TO RELATED APPLICATION

This application is a continuation application of and claims the priority benefit of U.S. application Ser. No. 17/123,141, filed on Dec. 16, 2020. The prior U.S. application Ser. No. 17/123,141 is a continuation application of and claims the priority benefit of U.S. application Ser. No. 16/687,707, filed on Nov. 19, 2019, which is a continuation application of and claims the priority benefit of U.S. application Ser. No. 16/103,940, filed on Aug. 15, 2018. The U.S. application Ser. No. 16/103,940 is a continuation application of and claims the priority benefit of U.S. application Ser. No. 15/585,165, filed on May 3, 2017, which claims the priority benefit of Chinese application serial no. 201710182902.5, filed on Mar. 24, 2017. The entirety of each of the above-mentioned patent applications is hereby incorporated by reference herein and made a part of this specification.

BACKGROUND OF THE INVENTION

1. Field of the Invention

The invention relates to an optical imaging system.

2. Description of Related Art

In recent years, the popularity of portable electronic products such as cell phones and digital cameras enhances flourish development of techniques related to image modules. The image modules mainly include elements such as an optical imaging lens, a module holder unit and a sensor, and the demand for minimizing the image module also increases due to the trend of the compact and slim design of mobile phones and digital cameras. Along with the progress in the technologies related to charge coupled devices (CCD) and complementary metal oxide semiconductors (CMOS) and reduction in the dimensions of the CCD and CMOS, the length of the optical imaging lens installed in the image module also has to be correspondingly reduced. However, in order to avoid reduction in photography effect and quality, preferable optical properties should also be achieved while the length of the optical imaging lens is minified. The imaging quality and volume are two of the most important characteristics for an optical imaging lens.

As the specifications of portable electronic products (such as cell phones, cameras, tablet PCs, personal digital assistants, photographic devices used in cars, virtual reality trackers, etc.) are ever-changing, key elements, i.e. optical imaging lenses, are also developed diversely, which can be applied to not only image-taking and recording, but also environmental monitoring, driving recording and so on. Moreover, along with the advance of image sensing technology, consumers' demands for imaging quality also increases.

However, the optical imaging lens design cannot achieve the production of an optical imaging lens having both imaging quality and small size simply by reducing the size and maintaining the original ratio of a lens having good imaging quality, the design process involves material properties, and actual issues on the production line such as assembly yield also needs to be considered.

The technical difficulty of manufacturing a miniaturized lens is significantly greater than that of a traditional lens, and therefore how to manufacture an optical imaging lens satisfying consumer electronic product requirements and continuing to increase the imaging quality thereof have always been highly desired goals of production, government, and academia in the field.

In addition, with the increase in photographing demands plus the recent demands for telephotography, an optical zoom-like effect can be achieved better by a telephoto lens with a wide angle lens. The larger the focal length of the optical imaging lens is, the larger the telephoto magnification of the optical imaging lens is, and therefore, it is not easy to shorten the length of the telephoto lens. Moreover, the lens structure design where the lens elements are arranged on a straight line from an object to an image plane cannot satisfy the demands for current portable electronic products used with the telephoto lens. This is because current portable electronic products are most developed toward a goal of miniaturization, but the lens with the lens elements arranged on a straight line and having an overly large length cannot be placed in the thinned portable electronic products. The dilemma of reducing the lens length or increasing the magnification and the maintenance of imaging quality result in difficulty in the design of the optical imaging lens.

SUMMARY OF THE INVENTION

The invention provides an optical imaging system capable of maintaining preferable optical properties in a condition that a lens depth is reduced.

An embodiment of the invention provides an optical imaging system, including a reflector, a first lens element, a second lens element, a third lens element, a fourth lens element and a fifth lens element in order along an optical axis from an object side to an image side. The optical axis includes a first optical axis and a second optical axis not coinciding with the first optical axis. The first optical axis and the second optical axis intersect at an intersection point on a reflective surface of the reflector, and the lens elements of the optical imaging system which have refractive powers are only disposed along the second optical axis. The first lens element to the fifth lens element each includes an object-side surface facing towards the object side and allowing imaging rays to pass through and an image-side surface facing towards the image side and allowing the imaging rays to pass through. The object-side surface of the first lens element has a convex portion in a vicinity of the optical axis, and a material of the second lens element is a plastic material. The image-side surface of the third lens element has a convex portion in the vicinity of the optical axis or a concave portion in the vicinity of the optical axis. At least one of the object-side surface and the image-side surface of the fourth lens element is an aspheric surface, and the object-side surface and the image-side surface of the fifth lens element are aspheric surfaces. The optical imaging system further includes an aperture stop disposed between the reflector and the third lens element.

An embodiment of the invention provides an optical imaging system, configured to enable imaging rays to enter from a light inlet and arrive at an image plane of the optical imaging system through the optical imaging system for imaging. The optical imaging system includes a reflector, a first lens element, a second lens element, a third lens element, a fourth lens element and a fifth lens element in order along an optical axis from an object side to an image side. The optical axis includes a first optical axis and a second optical axis not coinciding with the first optical axis, the first optical axis and the second optical axis intersect at an intersection point on a reflective surface of the reflector, and the first lens element, the second lens element, the third lens element, the fourth lens element and the fifth lens element are arranged in order along the second optical axis. The first lens element to the fifth lens element each comprises an object-side surface facing towards the object side and allowing imaging rays to pass through and an image-side surface facing towards the image side and allowing the imaging rays to pass through. The object-side surface of the first lens element has a convex portion in a vicinity of the optical axis, and a material of the second lens element is a plastic material. The image-side surface of the third lens element has a convex portion in the vicinity of the optical axis or a concave portion in the vicinity of the optical axis. At least one of the object-side surface and the image-side surface of the fourth lens element is an aspheric surface, and the object-side surface and the image-side surface of the fifth lens element are aspheric surfaces. The optical imaging system further includes an aperture stop disposed between the reflector and the third lens element. The optical imaging system satisfies: (OP1/ImgH)×Fno≤3.1, wherein OP1 represents a distance from the light inlet to the intersection point along the first optical axis, ImgH represents an image height of the optical imaging system, and Fno represents an f-number of the optical imaging system.

An embodiment of the invention provides an optical imaging system, including a reflector, a first lens element, a second lens element, a third lens element, a fourth lens element and a fifth lens element in order along an optical axis from an object side to an image side. The optical axis includes a first optical axis and a second optical axis not coinciding with the first optical axis, and the first optical axis and the second optical axis intersect at an intersection point on a reflective surface of the reflector. the first lens element, the second lens element, the third lens element, the fourth lens element and the fifth lens element are arranged in order along the second optical axis and each has a radius of the clear aperture less than or equal to 2.5 millimeter (mm). The first lens element to the fifth lens element each includes a an object-side surface facing towards the object side and allowing imaging rays to pass through and an image-side surface facing towards the image side and allowing the imaging rays to pass through. The object-side surface of the first lens element has a convex portion in a vicinity of the optical axis, and a material of the second lens element is a plastic material. The image-side surface of the third lens element has a convex portion in the vicinity of the optical axis or a concave portion in the vicinity of the optical axis. At least one of the object-side surface and the image-side surface of the fourth lens element is an aspheric surface, and the object-side surface and the image-side surface of the fifth lens element are aspheric surfaces. The optical imaging system further includes an aperture stop disposed between the first lens element and the third lens element. The optical imaging system satisfies: 7.5 mm≤EFL≤13.5 mm, wherein EFL represents an effective focal length of the optical imaging system.

Based on the above, the optical imaging system of the embodiments of the invention can bring the following advantageous effects: the optical imaging system still can achieve the optical performance of effectively overcoming aberrations and provide preferable imaging quality by the arrangement of the reflector and the object-side surfaces or the image-side surfaces of the lens elements or according to designs of the conditional formulas in the condition that the system length or the lens depth of the optical imaging system is reduced.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic view illustrating a surface structure of a lens element.

FIG. 2 is a schematic view illustrating a concave and convex surface structure of a lens element and a ray focal point.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 6 is a schematic view illustrating an optical imaging system according to a first embodiment of the invention.

FIG. 7A to FIG. 7D illustrate a longitudinal spherical aberration and other aberrations of the optical imaging system according to the first embodiment of the invention.

FIG. 8 shows detailed optical data pertaining to the optical imaging system according to the first embodiment of the invention.

FIG. 9 shows aspheric parameters pertaining to the optical imaging system according to the first embodiment of the invention.

FIG. 10 is a schematic view illustrating an optical imaging system according to a second embodiment of the invention.

FIG. 11A to FIG. 11D illustrate a longitudinal spherical aberration and other aberrations of the optical imaging system according to the second embodiment of the invention.

FIG. 12 shows detailed optical data pertaining to the optical imaging system according to the second embodiment of the invention.

FIG. 13 shows aspheric parameters pertaining to the optical imaging system according to the second embodiment of the invention.

FIG. 16 shows detailed optical data pertaining to the optical imaging system according to the third embodiment of the invention.

FIG. 17 shows aspheric parameters pertaining to the optical imaging system according to the third embodiment of the invention.

FIG. 20 shows detailed optical data pertaining to the optical imaging system according to the fourth embodiment of the invention.

FIG. 21 shows aspheric parameters pertaining to the optical imaging system according to the fourth embodiment of the invention.

FIG. 22 is a schematic view illustrating an optical imaging system according to a fifth embodiment of the invention.

FIG. 23A to FIG. 23D illustrate a longitudinal spherical aberration and other aberrations of the optical imaging system according to the fifth embodiment of the invention.

FIG. 24 shows detailed optical data pertaining to the optical imaging system according to the fifth embodiment of the invention.

FIG. 25 shows aspheric parameters pertaining to the optical imaging system according to the fifth embodiment of the invention.

FIG. 26 is a schematic view illustrating an optical imaging system according to a sixth embodiment of the invention.

FIG. 27A to FIG. 27D illustrate a longitudinal spherical aberration and other aberrations of the optical imaging system according to the sixth embodiment of the invention.

FIG. 28 shows detailed optical data pertaining to the optical imaging system according to the sixth embodiment of the invention.

FIG. 29 shows aspheric parameters pertaining to the optical imaging system according to the sixth embodiment of the invention.

FIG. 30 is a schematic view illustrating an optical imaging system according to a seventh embodiment of the invention.

FIG. 31A to FIG. 31D illustrate a longitudinal spherical aberration and other aberrations of the optical imaging system according to the seventh embodiment of the invention.

FIG. 32 shows detailed optical data pertaining to the optical imaging system according to the seventh embodiment of the invention.

FIG. 33 shows aspheric parameters pertaining to the optical imaging system according to the seventh embodiment of the invention.

FIG. 36 shows detailed optical data pertaining to the optical imaging system according to the eighth embodiment of the invention.

FIG. 37 shows aspheric parameters pertaining to the optical imaging system according to the eighth embodiment of the invention.

FIG. 38 to FIG. 41 show important parameters and relation values thereof pertaining to the optical imaging system according to the first through the embodiments of the invention.

DESCRIPTION OF EMBODIMENTS

Figure 14:
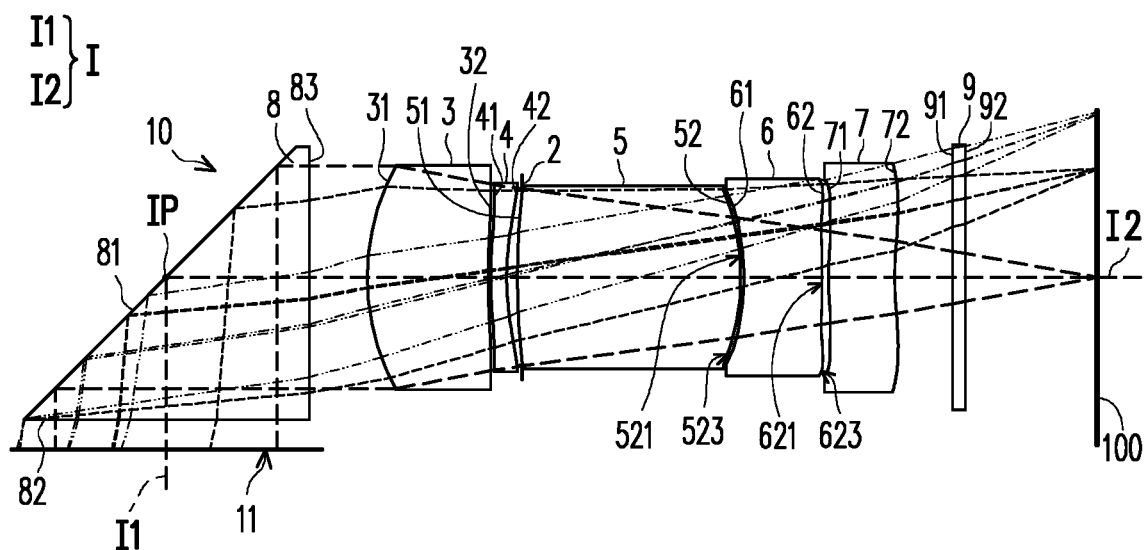
FIG. 14 is a schematic view illustrating an optical imaging system according to a third embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

FIG. 6 is a schematic view illustrating an optical imaging system according to a first embodiment of the invention, and FIG. 7A to FIG. 7D illustrate a longitudinal spherical aberration and other aberrations of the optical imaging system according to the first embodiment of the invention. Referring to FIG. 6 first, an optical imaging system 10 of the first embodiment of the invention includes a reflector 8, a first lens element 3, a second lens element 4, a third lens element 5, a fourth lens element 6, a fifth lens element 7 and a filter 9 in order along an optical axis I of the optical imagining system 10 from an object side to an image side. After rays emitted by an object to be photographed entering the optical imaging system 10 from an light inlet 11 and being sequentially reflected by the reflector 8 and passes through the first lens element 3, the second lens element 4, the third lens element 5, the fourth lens element 6, the fifth lens element 7 and the filter 9, an image is formed on an image plane 100. The light inlet 11 is located between the object side and the reflector 8. The filter 9 is, for example, an infrared cut-off filter used to block infrared light contained in the rays emitted by the object. It is to be additionally mentioned that the object side faces towards the object to be photographed, and the image side faces towards the image plane 100.

In the present embodiment, the optical axis I includes a first optical axis I1 and a second optical axis I2 not coinciding with the first optical axis I1. In the present embodiment, the optical axis I is bent by a reflective surface 81 of the reflector 8. The first optical axis I1 is a portion of the optical axis I before being bent by the reflector 8, and the second optical axis I2 is another portion of the optical axis I after being bent by the reflector 8. A ray transmitted along the first optical axis I1 is reflected by the reflective surface 81 and then transmitted along the second optical axis I2. Namely, the first optical axis I1 and the second optical axis I2 intersect at an intersection point IP on the reflective surface 81 of the reflector 8. In the present embodiment, the lens elements of the optical imaging system 10 which have refractive powers are only disposed on the second optical axis I2. In the present embodiment, the first lens element 3, the second lens element 4, the third lens element 5, the fourth lens element 6 and the fifth lens element 7 are arranged in order from the object side to the image side along the second optical axis I2 and each has a radius of the clear aperture (i.e., half of a diameter of the clear aperture) less than or equal to 2.5 mm. In the present embodiment, the reflector 8 is a prism and has a light-entering surface 82, the reflective surface 81 and a light-emitting surface 83. The ray from the light inlet 11 entering the prism through the light-entering surface 82 is reflected by the reflective surface 81, then emitted from the prism through the light-emitting surface 83 and transmitted to the first lens element 3. However, in other embodiments, the reflector 8 may also be a mirror or other adaptive reflective elements, and a position where a reflective surface of the mirror is disposed may be the same as a position where the reflective surface 81 of the prism (i.e., the reflector 8) is disposed.

The first lens element 3, the second lens element 4, the third lens element 5, the fourth lens element 6, the fifth lens element 7 and the filter 9 respectively have object-side surfaces 31, 41, 51, 61, 71 and 91 facing towards the object side and allowing imaging rays to pass through and image-side surfaces 32, 42, 52, 62, 72 and 92 facing towards the image side and allowing the imaging rays to pass through.

In the present embodiment, in order to satisfy demands for product miniaturization, the first lens element 3 to the fifth lens element 7 all have refractive powers, and the first lens element 3, the second lens element 4, the third lens element 5, the fourth lens element 6 and the fifth lens element 7 are all made of a plastic material, namely, a material of the lens elements is a plastic material, but the material of the first lens element 3 to the fifth lens element 7 is not limited thereto.

The first lens element 3 has a positive refractive power. An object-side surface 31 of the first lens element 3 has a convex portion 311 in a vicinity of the optical axis I and a convex portion 313 in a vicinity of a periphery of the first lens element 3. An image-side surface 32 of the first lens element 3 has a concave portion 322 in the vicinity of the optical axis I and a concave portion 324 in the vicinity of the periphery of the first lens element 3.

The second lens element 4 has a negative refractive power. The object-side surface 41 of the second lens element 4 has a convex portion 411 in the vicinity of the optical axis I and a convex portion 413 in the vicinity of the periphery of the second lens element 4. An image-side surface 42 of the second lens element 4 has a concave portion 422 in the vicinity of the optical axis I and a concave portion 424 in the vicinity of the periphery of the second lens element 4.

The third lens element 5 has a positive refractive power. An object-side surface 51 of the third lens element 5 has a convex portion 511 in the vicinity of the optical axis I and a convex portion 513 in the vicinity of the periphery of the third lens element 5. An image-side surface 52 of the third lens element 5 has a concave portion 522 in the vicinity of the optical axis I and a concave portion 524 in the vicinity of the periphery of the third lens element 5.

The fourth lens element 6 has a negative refractive power. An object-side surface 61 of the fourth lens element 6 has a concave portion 612 in the vicinity of the optical axis I and a concave portion 614 in the vicinity of the periphery of the fourth lens element 6. An image-side surface 42 of the fourth lens element 6 has a convex portion 621 in the vicinity of the optical axis I and a concave portion 624 in the vicinity of the periphery of the fourth lens element 6.

The fifth lens element 7 has a positive refractive power. An object-side surface 71 of the fifth lens element 7 has a convex portion 711 in the vicinity of the optical axis I and a concave portion 714 in the vicinity of the periphery. An image-side surface 72 of the fifth lens element 7 has a concave portion 722 in the vicinity of the optical axis I and a convex portion 723 in the vicinity of the periphery of the fifth lens element 7.

Additionally, in the present embodiment, only the aforementioned lens elements have refractive powers, and only 5 lens elements of the optical imaging system 10 have the refractive powers. However, in other embodiments, other lens elements having refractive powers may also be disposed along the second optical axis I2, and the number of the lens elements of the optical imaging system 10 which have the refractive powers may be more than 5.

The optical imaging system 10 may further include an aperture stop 2 disposed between the reflector 8 and the third lens element 5. In the present embodiment, the aperture stop 2 is located between the second lens element 4 and the third lens element 5. However, in other embodiments, the aperture stop 2 may be located between the reflector 8 and the first lens element 3, or between the first lens element 3 and the second lens element 4.

Other detailed optical data of the first embodiment is illustrated in FIG. 8, and in the first embodiment, an effective focal length (EFL) of the optical imaging system 10 is 7.614 mm, a half field of view (HFOV) is 16.799°, an f-number (Fno) is 2.420, a system length (TTL) is 7.528 mm, and an image height (ImgH) is 2.331 mm. The TTL refers to a distance from the object-side surface 31 of the first lens element 3 to the image plane 100 along the second optical axis I2. In FIG. 8, the "Semi-diameter" refers to a radius of the clear aperture of the object-side surface 31, 41, 51, 61, 71 or the image-side surface 32, 42, 52, 62, 72, and the "Semi-diameter" in the optical data charts of a second to an eight embodiments physically means the same.

In the present embodiment, an included angle between a normal line of the reflective surface 81 and the first optical axis I1 is 45°, an included angle between the normal line of the reflective surface 81 and the second optical axis I2 is 45°. The normal line of the reflective surface 81, the first optical axis I1 and the second optical axis I2 are co-planar, and an included angle between the first optical axis I1 and the second optical axis I2 is 90°. However, in other embodiments, the included angle between the first optical axis I1 and the second optical axis I2 may be less than 90° or more than 90°.

Additionally, in the present embodiment, the object-side surfaces 31, 41, 51, 61 and 71 and the image-side surfaces 32, 42, 52, 62 and 72 of the first lens element 3, the second lens element 4, the third lens element 5, the fourth lens element 6 and the fifth lens element 7, which are 8 surfaces in total, are all aspheric surfaces, and the aspheric surfaces are defined by the following formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i, \quad (1)$$

wherein:
Y: a distance from a point on an aspheric curve to the second optical axis I2;
Z: a depth of the aspheric surface (i.e. a perpendicular distance between the point on the aspheric surface that is spaced by the distance Y from the second optical axis I2 and a tangent plane tangent to a vertex of the aspheric surface along the second optical axis I2);
R: a radius of curvature of the surface of the lens element near the second optical axis I2;
K: a conic constant;
$a_i$: the $i^{th}$ aspheric coefficient.

The aspheric coefficients of the object-side surfaces 31, 41, 51, 61 and 71 and the image-side surfaces 32, 42, 52, 62 and 72 in formula (1) are shown in FIG. 9. Therein, column No. 31 in FIG. 9 represents the aspheric coefficient of the object-side surface 31 of the first lens element 3, and the other columns may be derived in the same way.

In addition, the relations among important parameters pertaining to the optical imaging system 10 in the first embodiment are shown in FIG. 38 and FIG. 39.

Therein,

T1 represents a thickness of the first lens element 3 along the second optical axis I2;

T2 represents a thickness of the second lens element 4 along the second optical axis I2;

T3 represents a thickness of the third lens element 5 along the second optical axis I2;

T4 represents a thickness of the fourth lens element 6 along the second optical axis I2;

T5 represents a thickness of the fifth lens element 7 along the second optical axis I2;

TF represents a thickness of the filter 9 along the second optical axis I2;

OP1 represents a distance from the light inlet 11 to the intersection point IP of the first optical axis I1 and the second optical axis I2 along the first optical axis I1;

OP2 represents a distance from the intersection point IP of the first optical axis I1 and the second optical axis I2 to the image plane 100 of the optical imaging system 10 along the second optical axis I2;

G12 represents a distance from the image-side surface 32 of the first lens element 3 to the object-side surface 41 of the second lens element 4 along the second optical axis I2, i.e., an air gap from the first lens element 3 to the second lens element 4 along the second optical axis I2;

G23 represents a distance from the image-side surface 42 of the second lens element 4 to the object-side surface 51 of the third lens element 5 along the second optical axis I2, i.e., an air gap from the second lens element 4 to the third lens element 5 along the second optical axis I2;

G34 represents a distance from the image-side surface 52 of the third lens element 5 to the object-side surface 61 of the fourth lens element 6 along the second optical axis I2, i.e., an air gap from the third lens element 5 to the fourth lens element 6 along the second optical axis I2;

G45 represents a distance from the image-side surface 62 of the fourth lens element 6 to the object-side surface 71 of the fifth lens element 7 along the second optical axis I2, i.e., an air gap from the fourth lens element 6 to the fifth lens element 7 along the second optical axis I2;

G5F represents a distance from the image-side surface 72 of the fifth lens element 7 to the object-side surface 91 of the filter 9 along the second optical axis I2, i.e., an air gap from the fifth lens element 7 to the filter 9 along the second optical axis I2;

GFP represents a distance from the image-side surface 92 of the filter 9 to the image plane 100 along the second optical axis I2, i.e., an air gap from the filter 9 to the image plane 100 along the second optical axis I2;

AAG represents a sum of the four air gaps from the first lens element 3 to the fifth lens element 7 along the second optical axis I2, i.e., a sum of G12, G23, G34 and G45;

ALT represents a sum of the thicknesses of the first lens element 3, the second lens element 4, the third lens element 5, the fourth lens element 6 and the fifth lens element 7 along the second optical axis I2, i.e., a sum of T1, T2, T3, T4 and T5;

TTL represents a distance from the object-side surface 31 of the first lens element 3 to the image plane 100 along the second optical axis I2;

TL represents a distance of the object-side surface 31 of the first lens element 3 to the image-side surface 72 of the fifth lens element 7 along the second optical axis I2;

BFL represents a distance from the image-side surface 72 of the fifth lens element 7 to the image plane 100 along the second optical axis I2;

EFL represents an effective focal length of the optical imaging system 10;

ImgH represents an image height of the optical imaging system 10;

Fno represents an f-number of the optical imaging system 10; and

Depth represents a lens depth, i.e., a distance in a direction along the first optical axis I1 from the light inlet 11 to a position P of the aforementioned optical elements which is farthest away from the light inlet 11 in a direction parallel to the first optical axis I1, in brief, a distance from the light inlet 11 to the position P in a direction along the first optical axis I1. The position P may be located on the top edge of the reflector 8, the first lens element 3, the second lens element 4, the third lens element 5, the fourth lens element 6, the fifth lens element 7, the filter 9 or the image plane 100 in the figure as long as this position is farthest away from the light inlet 11 along the first optical axis I1. In the first to the eight embodiments, the position P may be located on the top edge of the image plane 100 in the figure, and in this circumstance, the value of the lens depth Depth is related to the values of OP1 and ImgH.

In addition, it is defined that:

f1 represents a focal length of the first lens element 3;

f2 represents a focal length of the second lens element 4;

f3 represents a focal length of the third lens element 5;

f4 represents a focal length of the fourth lens element 6;

f5 represents a focal length of the fifth lens element 7;

n1 represents an index of refraction of the first lens element 3;

n2 represents an index of refraction of the second lens element 4;

n3 represents an index of refraction of the third lens element 5;

n4 represents an index of refraction of the fourth lens element 6;

n5 represents an index of refraction of the fifth lens element 7;

v1 represents an Abbe number of the first lens element 3, wherein the Abbe number may also be referred to as coefficient of dispersion;

v2 represents an Abbe number of the second lens element 4;

v3 represents represents an Abbe number of the third lens element 5;

v4 represents represents an Abbe number of the fourth lens element 6; and v5 represents an Abbe number of the fifth lens element 7.

Referring further to FIG. 7A to FIG. 7D, FIG. 7A illustrates a longitudinal spherical aberration of the first embodiment when a pupil radius thereof is 1.5731 mm, FIG. 7B and FIG. 7C respectively illustrate the field curvature in the sagittal direction and the field curvature in the tangential direction on the image plane 100 of the first embodiment when the wavelengths thereof are 650 nm, 555 nm, and 470 nm, and FIG. 7D, and FIG. 7D illustrates the distortion aberration on the image plane 100 of the first embodiment when the wavelengths thereof are 650 nm, 555 nm, and 470 nm. In the longitudinal spherical aberration figure of FIG. 7A of the first embodiment, the curves formed by various wavelengths are all very close and are in a vicinity of the center, which indicates that off-axis rays at different heights of each wavelength are all concentrated in a vicinity of imaging point and it can be seen from the deflection amplitude of the curve of each wavelength that the imaging point deviation of the off-axis rays at different heights is controlled within a range of ±23 microns, and therefore, in the present embodiment, the spherical aberration of the same wavelength is indeed significantly improved. Moreover, the distances between the three representative wavelengths are also relatively close, which indicates that the imaging positions of different wavelength rays are substantially concentrated, and therefore, the chromatic aberration is also significantly improved.

In the two field curvature figures of FIG. 7B and FIG. 7C, the focal length variation amount of the three representative wavelengths in the entire field of view is within a range of ±55 microns, which indicates that the optical system of the first embodiment can effectively eliminate aberrations. The distortion aberration figure of FIG. 7D shows that the distortion aberration of the first embodiment is maintained within a range of ±1.55%, which indicates that the distortion aberration of the first embodiment satisfies the imaging quality requirements of the optical system, and accordingly, by comparing the first embodiment with the current optical lens, the first embodiment still can provide preferable imaging quality in the condition that the TTL is reduced to about 7.528 mm. Therefore, in the first embodiment, the lens depth and the TTL can be reduced, and the effective focal length of the optical imaging system 10 can be increased in the condition that the preferable optical performance is maintained, thereby achieving a telephoto effect. Additionally, in the optical imaging system 10 of the present embodiment, the light path is bent by means of the disposition of the reflector 8, such that the lens depth can be reduced to meet the design of the portable electronic products developed toward the goal of miniaturization, thereby enabling the thinned portable electronic product to be equipped with a telephoto lens.

FIG. 10 is a schematic of an optical imaging system of a second embodiment of the invention, and FIG. 11A to FIG. 11D are diagrams of the longitudinal spherical aberration and various aberrations of the optical imaging lens of the second embodiment. Referring first to FIG. 10, the second embodiment of the optical imaging system 10 of the invention is substantially similar to the first embodiment, and the difference therebetween is as follows. The optical data, the aspheric coefficients, and the parameters of the lens elements 3, 4, 5, 6 and 7 may be somewhat different. Moreover, in the present embodiment, the image-side surface 52 of the third lens element 5 has a convex portion 521 in the vicinity of the optical axis I and a convex portion 523 in the vicinity of the periphery of the third lens element 5. The image-side surface 62 of the fourth lens element 6 has a convex portion 621 in the vicinity of the optical axis I and a convex portion 623 in the vicinity of the periphery of the fourth lens element 6. It should be noted here that, in order to clearly show the figure, a portion of the reference numerals of the same concave portion and convex portion as the first embodiment is omitted in FIG. 10.

The detailed optical data of the optical imaging system 10 is as shown in FIG. 12, and in the second embodiment, the EFL of the optical imaging system 10 is 9.677 mm, the HFOV is 16.000°, the Fno is 2.420, the TTL is 9.721 mm, and the ImgH is 2.805 mm.

FIG. 13 shows each of the aspheric coefficients of the object-side surfaces 31, 41, 51, 61 and 71 and the image-side surfaces 32, 42, 52, 62 and 72 of the second embodiment in formula (1).

Additionally, the relationship between each of the important parameters pertaining to the optical imaging system 10 of the second embodiment is as shown in FIG. 38 and FIG. 39.

In the longitudinal spherical aberration figure of FIG. 11A of the second embodiment in the condition that the pupil radius thereof is 1.9993 mm, the imaging point deviation of off-axis rays at different heights is controlled within a range of ±22 microns. In the two field curvature aberration figures of FIG. 11B and FIG. 11C, the focal length variation amount of the three representative wavelengths in the entire field of view falls within a range of ±70 microns. The distortion aberration figure of FIG. 11D shows that the distortion aberration of the second embodiment is maintained within a range of ±1.2%. Accordingly, by comparing the second embodiment with the current optical lens, the second embodiment still can provide preferable imaging quality in the condition that the TTL is reduced to about 9.721 mm.

It can be known from the above that the advantages of the second embodiment in comparison with the first embodiment are: the HFOV of the second embodiment is less than that of the first embodiment, which facilitates increasing the telephoto properties, the longitudinal aberration of the second embodiment is less than that of the first embodiment, and the distortion of the second embodiment is less than that of the first embodiment. In addition, as the difference of the thicknesses of the lens elements in the vicinity of the optical axis I and the thicknesses of the lens elements in the vicinity of the periphery in the second embodiment is smaller than that in the first embodiment, the second embodiment is easier to be manufactured than the first embodiment and thus, has a better yield rate.

FIG. 14 is a schematic view illustrating an optical imaging system according to a third embodiment of the invention, and FIG. 15A to FIG. 15D illustrate a longitudinal spherical aberration and other aberrations of the optical imaging system according to the third embodiment of the invention. Referring to FIG. 14 first, the third embodiment of the optical imaging system 10 of the invention is substantially similar to the first embodiment, and the difference is described as follows. The optical data, the aspheric coefficients, and the parameters of the lens elements 3, 4, 5, 6 and 7 may be somewhat different. Additionally, in the present embodiment, the image-side surface 52 of the third lens element 5 has a convex portion 521 in the vicinity of the optical axis I and a convex portion 523 in the vicinity of the periphery of the third lens element 5. The image-side surface 62 of the fourth lens element 6 has a convex portion 621 in the vicinity of the optical axis I and a convex portion 623 in the vicinity of the periphery of the fourth lens element 6. Moreover, the fifth lens element 7 has a negative refractive power. It should be noted here that, in order to clearly show the figure, a portion of the reference numerals of the same concave portion and convex portion as the first embodiment is omitted in FIG. 14.

The detailed optical data of the optical imaging system 10 is as shown in FIG. 16, and in the third embodiment, the EFL of the optical imaging system 10 is 10.504 mm, the HFOV is 15.998°, the Fno is 2.627, the TTL is 12.542 mm, and the ImgH is 2.795 mm.

FIG. 17 shows each of the aspheric coefficients of the object-side surfaces 31, 41, 51, 61 and 71 and the image-side surfaces 32, 42, 52, 62 and 72 of the third embodiment in formula (1).

Additionally, the relationship between each of the important parameters pertaining to the optical imaging system 10 of the third embodiment is as shown in FIG. 38 and FIG. 39.

Figures 15A, 15B, 15C, 15D:
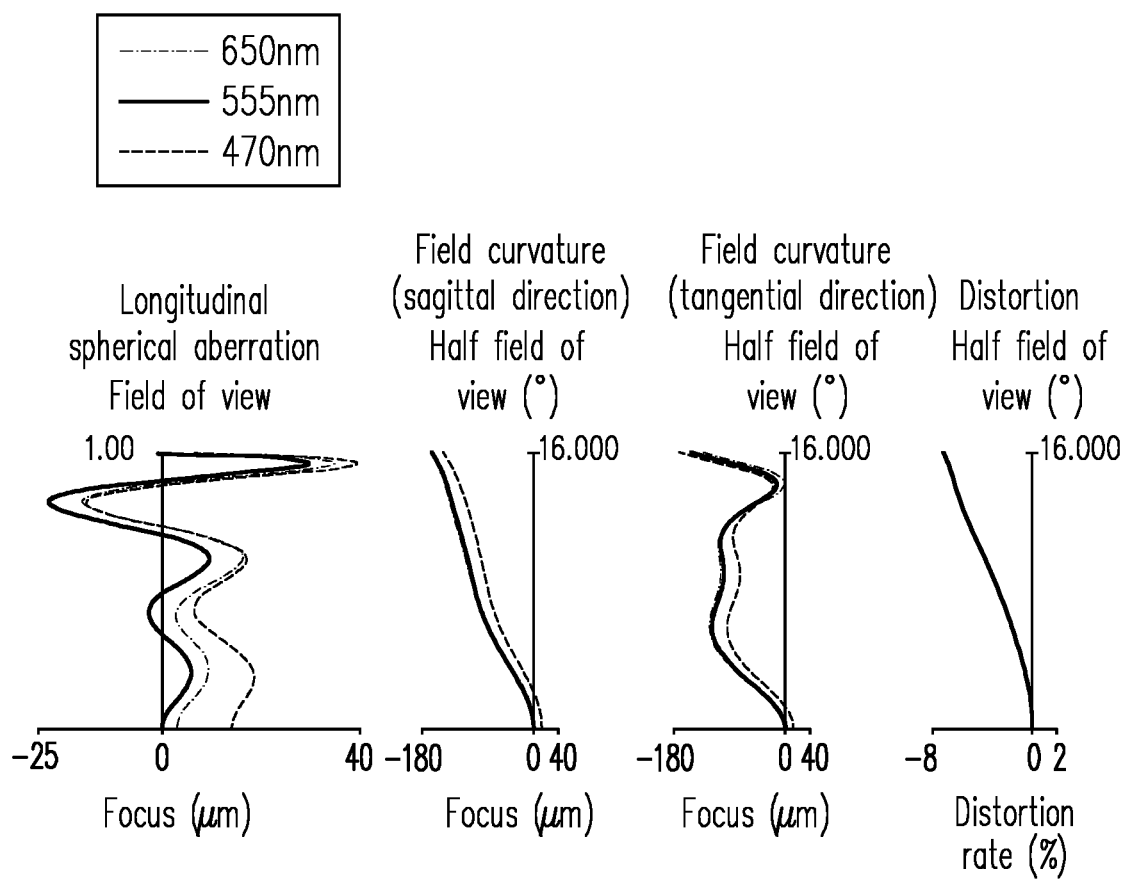
FIG. 15A to FIG. 15D illustrate a longitudinal spherical aberration and other aberrations of the optical imaging system according to the third embodiment of the invention.

In the longitudinal spherical aberration figure of FIG. 15A of the third embodiment in the condition that the pupil radius thereof is 1.9990 mm, the imaging point deviation of off-axis rays at different heights is controlled within a range of ±40 microns. In the two field curvature aberration figures of FIG. 15B and FIG. 15C, the focal length variation amount of the three representative wavelengths in the entire field of view falls within a range of ±180 microns. The distortion aberration figure of FIG. 15D shows that the distortion aberration of the third embodiment is maintained within a range of ±7.5%. Accordingly, by comparing the third embodiment with the current optical lens, the third embodiment still can provide preferable imaging quality in the condition that the TTL is reduced to about 12.542 mm.

It can be known from the above that the advantages of the third embodiment in comparison with the first embodiment are: the HFOV of the third embodiment is less than that of the first embodiment, which facilitates increasing the telephoto properties, and as the difference of the thicknesses of the lens elements in the vicinity of the optical axis I and the thicknesses of the lens elements in the vicinity of the periphery is smaller, the third embodiment is easier to be manufactured than the first embodiment and thus, has a better yield rate.

Figure 18:
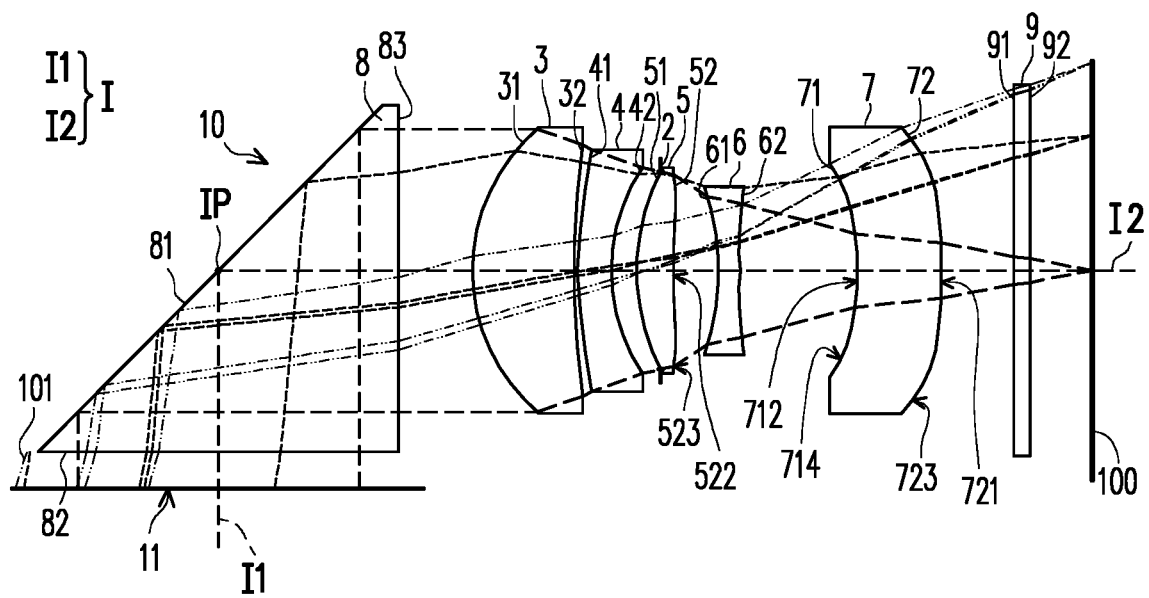
FIG. 18 is a schematic view illustrating an optical imaging system according to a fourth embodiment of the invention.

FIG. 18 is a schematic view illustrating an optical imaging system according to a fourth embodiment of the invention, and FIG. 19A to FIG. 19D illustrate a longitudinal spherical aberration and other aberrations of the optical imaging system according to the fourth embodiment of the invention. Referring to FIG. 18 first, the fourth embodiment of the optical imaging system 10 of the invention is substantially similar to the first embodiment, and the difference is described as follows. The optical data, the aspheric coefficients, and the parameters of the lens elements 3, 4, 5, 6 and 7 may be somewhat different. Additionally, in the present embodiment, the image-side surface 52 of the third lens element 5 has a concave portion 522 in the vicinity of the optical axis I and a convex portion 523 in the vicinity of the periphery of the third lens element 5. The fifth lens element 7 has a negative refractive power. The object-side surface 71 of the fifth lens element 7 has a concave portion 712 in the vicinity of the optical axis I and a concave portion 714 in the vicinity of the periphery of the fifth lens element 7. Moreover, in the present embodiment, the image-side surface 72 of the fifth lens element 7 has a convex portion 721 in the vicinity of the optical axis I and a convex portion 723 in the vicinity of the periphery of the fifth lens element 7. It should be noted here that, in order to clearly show the figure, a portion of reference numerals of the same concave portion and convex portion as the first embodiment is omitted in FIG. 18. Additionally, in the present embodiment, light 101 entering from the edge of the light inlet 11 is incapable of arriving at the reflective surface 81 due to the specification design of the optical imaging system 10.

The detailed optical data of the optical imaging system 10 is as shown in FIG. 20, and in the fourth embodiment, the EFL of the optical imaging system 10 is 10.139 mm, the HFOV is 15.999°, the Fno is 2.42, the TTL is 8.411 mm, and the ImgH is 2.808 mm.

FIG. 21 shows each of the aspheric coefficients of the object-side surfaces 31, 41, 51, 61 and 71 and the image-side surfaces 32, 42, 52, 62 and 72 of the fourth embodiment in formula (1).

Additionally, the relationship between each of the important parameters pertaining to the optical imaging system 10 of the fourth embodiment is as shown in FIG. 38 and FIG. 39.

Figures 19A, 19B, 19C, 19D:
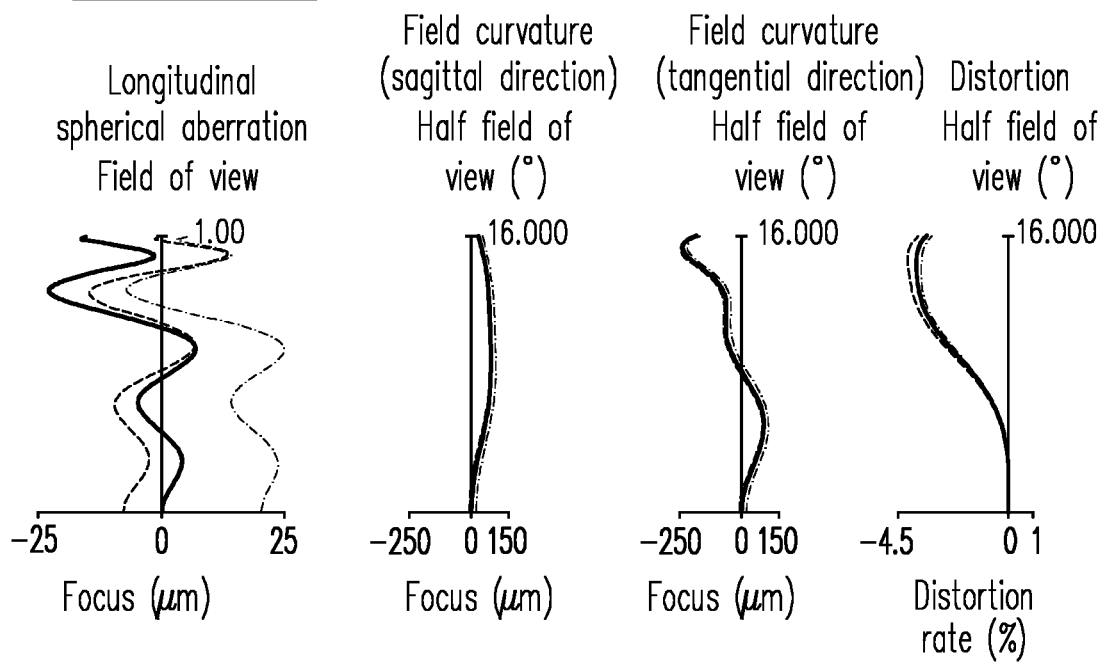
FIG. 19A to FIG. 19D illustrate a longitudinal spherical aberration and other aberrations of the optical imaging system according to the fourth embodiment of the invention.

In the longitudinal spherical aberration figure of FIG. 19A of the fourth embodiment in the condition that the pupil radius thereof is 2.0948 mm, the imaging point deviation of off-axis rays at different heights is controlled within a range of ±25 microns. In the two field curvature aberration figures of FIG. 19B and FIG. 19C, the focal length variation amount of the three representative wavelengths in the entire field of view falls within a range of ±250 microns. The distortion aberration figure of FIG. 19D shows that the distortion aberration of the fourth embodiment is maintained within a range of ±4.3%. Accordingly, by comparing the fourth embodiment with the current optical lens, the fourth embodiment still can provide preferable imaging quality in the condition that the TTL is reduced to about 8.411 mm.

It can be known from the above that the advantages of the fourth embodiment in comparison with the first embodiment are: the HFOV of the fourth embodiment is less than that of the first embodiment, which facilitates increasing the telephoto properties.

FIG. 22 is a schematic view illustrating an optical imaging system according to a fifth embodiment of the invention, and FIG. 23A to FIG. 23D illustrate a longitudinal spherical aberration and other aberrations of the optical imaging system according to the fifth embodiment of the invention. Referring to FIG. 22 first, the fifth embodiment of the optical imaging system 10 of the invention is substantially similar to the first embodiment, and the difference is described as follows. The optical data, the aspheric coefficients, and the parameters of the lens elements 3, 4, 5, 6 and 7 may be somewhat different. Additionally, in the present embodiment, the image-side surface 52 of the third lens element 5 has a convex portion 521 in the vicinity of the optical axis I and a convex portion 523 in the vicinity of the periphery of the third lens element 5. It should be noted here that, in order to clearly show the figure, a portion of reference numerals of the same concave portion and convex portion as the first embodiment is omitted in FIG. 22.

The detailed optical data of the optical imaging system 10 is as shown in FIG. 24, and in the fifth embodiment, the EFL of the optical imaging system 10 is 8.807 mm, the HFOV is 21.501°, the Fno is 2.203, the TTL is 9.048 mm, and the ImgH is 3.903 mm.

FIG. 25 shows each of the aspheric coefficients of the object-side surfaces 31, 41, 51, 61 and 71 and the image-side surfaces 32, 42, 52, 62 and 72 of the fifth embodiment in formula (1).

Additionally, the relationship between each of the important parameters pertaining to the optical imaging system 10 of the fifth embodiment is as shown in FIG. 40 and FIG. 41.

In the longitudinal spherical aberration figure of FIG. 23A of the fifth embodiment in the condition that the pupil radius thereof is 1.9990 mm, the imaging point deviation of off-axis rays at different heights is controlled within a range of ±11.5 microns. In the two field curvature aberration figures of FIG. 23B and FIG. 23C, the focal length variation amount of the three representative wavelengths in the entire field of view falls within a range of ±115 microns. The distortion aberration figure of FIG. 23D shows that the distortion aberration of the fifth embodiment is maintained within a range of ±13%. Accordingly, by comparing the fifth embodiment with the current optical lens, the fifth embodiment still can provide preferable imaging quality in the condition that the TTL is reduced to about 9.048 mm.

It can be known from the above that the advantages of the fifth embodiment in comparison with the first embodiment are: the f-number of the fifth embodiment is smaller than that of the first embodiment, and the longitudinal aberration of the fifth embodiment is less than that of the first embodiment. Additionally, as the difference of the thicknesses of the lens elements in the vicinity of the optical axis I and the thicknesses of the lens elements in the vicinity of the periphery in the fifth embodiment is smaller, the fifth embodiment is easier to be manufactured than the first embodiment and thus, has a better yield rate.

FIG. 26 is a schematic view illustrating an optical imaging system according to a sixth embodiment of the invention, and FIG. 27A to FIG. 27D illustrate a longitudinal spherical aberration and other aberrations of the optical imaging system according to the sixth embodiment. Referring to FIG. 26 first, the sixth embodiment of the optical imaging system 10 of the invention is substantially similar to the first embodiment, and the difference is described as follows. The optical data, the aspheric coefficients, and the parameters of the lens elements 3, 4, 5, 6 and 7 may be somewhat different. Additionally, in the present embodiment, the image-side surface 52 of the third lens element 5 has a convex portion 521 in the vicinity of the optical axis I and has a convex portion 523 in the vicinity of the periphery of the third lens element 5. Moreover, in the present embodiment, the aperture stop 2 is located between the first lens element 3 and the second lens element 4. It should be noted here that, in order to clearly show the figure, a portion of reference numerals of the same concave portion and convex portion as the first embodiment is omitted in FIG. 26.

The detailed optical data of the optical imaging system 10 is as shown in FIG. 28, and in the sixth embodiment, the EFL of the optical imaging system 10 is 9.712 mm, the HFOV is 15.998°, the Fno is 2.420, the TTL is 9.540 mm, and the ImgH is 2.8 mm.

FIG. 29 shows each of the aspheric coefficients of the object-side surfaces 31, 41, 51, 61 and 71 and the image-side surfaces 32, 42, 52, 62 and 72 of the sixth embodiment in formula (1).

Additionally, the relationship between each of the important parameters pertaining to the optical imaging system 10 of the sixth embodiment is as shown in FIG. 40 and FIG. 41.

In the longitudinal spherical aberration figure of FIG. 27A of the sixth embodiment in the condition that the pupil radius thereof is 2.0065 mm, the imaging point deviation of off-axis rays at different heights is controlled within a range of ±61 microns. In the two field curvature aberration figures of FIG. 27B and FIG. 27C, the focal length variation amount of the three representative wavelengths in the entire field of view falls within a range of ±80 microns. The distortion aberration figure of FIG. 27D shows that the distortion aberration of the sixth embodiment is maintained within a range of ±0.9%. Accordingly, by comparing the sixth embodiment with the current optical lens, the sixth embodiment still can provide preferable imaging quality in the condition that the TTL is reduced to about 9.540 mm.

It can be known from the above that the advantages of the sixth embodiment in comparison with the first embodiment are: the HFOV of the sixth embodiment is less than that of the first embodiment, which facilitates increasing the telephoto properties, and the distortion of the sixth embodiment is less than that of the first embodiment. Additionally, as the difference of the thicknesses of the lens elements in the vicinity of the optical axis I and the thicknesses of the lens elements in the vicinity of the periphery in the sixth embodiment is smaller, the sixth embodiment is easier to be manufactured than the first embodiment and thus, has a better yield rate.

FIG. 30 is a schematic view illustrating an optical imaging system according to a seventh embodiment, and FIG. 31A to FIG. 31D illustrate a longitudinal spherical aberration and other aberrations of the optical imaging system according to the seventh embodiment of the invention. Referring to FIG. 30 first, the seventh embodiment of the optical imaging system 10 of the invention is substantially similar to the first embodiment, and the difference is described as follows. The optical data, the aspheric coefficients, and the parameters of the lens elements 3, 4, 5, 6 and 7 may be somewhat different. Additionally, in the present embodiment, the image-side surface 52 of the third lens element 5 has a convex portion 521 in the vicinity of the optical axis I and a convex portion 523 in the vicinity of the periphery of the third lens element 5. The image-side surface 72 of the fifth lens element 7 has a convex portion 721 in the vicinity of the optical axis I and a convex portion 723 in the vicinity of the periphery of the third lens element 5. It should be noted here that, in order to clearly show the figure, a portion of reference numerals of the same concave portion and convex portion as the first embodiment is omitted in FIG. 30.

The detailed optical data of the optical imaging system 10 is as shown in FIG. 32, and in the seventh embodiment, the EFL of the optical imaging system 10 is 9.864 mm, the HFOV is 16.08°, the Fno is 2.420, the TTL is 9.654 mm, and the ImgH is 2.815 mm.

FIG. 33 shows each of the aspheric coefficients of the object-side surfaces 31, 41, 51, 61 and 71 and the image-side surfaces 32, 42, 52, 62 and 72 of the seventh embodiment in formula (1).

Additionally, the relationship between each of the important parameters pertaining to the optical imaging system 10 of the seventh embodiment is as shown in FIG. 40 and FIG. 41.

In the longitudinal spherical aberration figure of FIG. 31A of the seventh embodiment in the condition that the pupil radius thereof is 2.0379 mm, the imaging point deviation of off-axis rays at different heights is controlled within a range of ±60 microns. In the two field curvature aberration figures of FIG. 31B and FIG. 31C, the focal length variation amount of the three representative wavelengths in the entire field of view falls within a range of ±60 microns. The distortion aberration figure of FIG. 31D shows that the distortion aberration of the seventh embodiment is maintained within a range of ±0.47%. Accordingly, by comparing the seventh embodiment with the current optical lens, the seventh embodiment still can provide preferable imaging quality in the condition that the TTL is reduced to about 9.654 mm.

It can be known from the above that the advantages of the seventh embodiment in comparison with the first embodiment are: the HFOV of the seventh embodiment is less than that of the first embodiment, which facilitates increasing the telephoto properties, and the distortion of the seventh embodiment is less than that of the first embodiment. Additionally, as the difference of the thicknesses of the lens elements in the vicinity of the optical axis I and the thicknesses of the lens elements in the vicinity of the periphery in the seventh embodiment is smaller, the seventh embodiment is easier to be manufactured than the first embodiment and thus, has a better yield rate.

Figure 34:
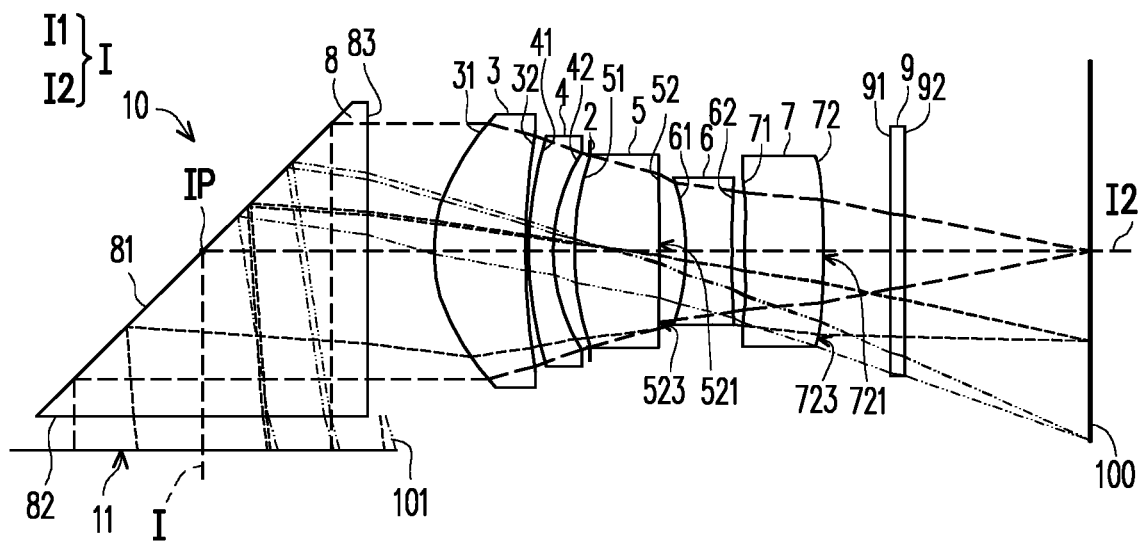
FIG. 34 is a schematic view illustrating an optical imaging system according to an eighth embodiment of the invention.

FIG. 34 is a schematic view illustrating an optical imaging system according to an eighth embodiment, and FIG. 35A to FIG. 35D illustrate a longitudinal spherical aberration and other aberrations of the optical imaging system according to the eighth embodiment. Referring to FIG. 34 first, the eighth embodiment of the optical imaging system 10 of the invention is substantially similar to the first embodiment, and the difference is described as follows. The optical data, the aspheric coefficients, and the parameters of the lens elements 3, 4, 5, 6 and 7 may be somewhat different. Additionally, in the present embodiment, the image-side surface 52 of the third lens element 5 has a convex portion 521 in the vicinity of the optical axis I and a convex portion 523 in the vicinity of the periphery of the third lens element 5. The image-side surface 72 of the fifth lens element 7 has a convex portion 721 in the vicinity of the optical axis I and a convex portion 723 in the vicinity of the periphery of the fifth lens element 7. It should be noted here that, in order to clearly show the figure, a portion of reference numerals of the same concave portion and convex portion as the first embodiment is omitted in FIG. 34.

The detailed optical data of the optical imaging system 10 is as shown in FIG. 36, and in the eighth embodiment, the EFL of the optical imaging system 10 is 9.940 mm, the HFOV is 16.091°, the Fno is 2.420, the TTL is 9.711 mm, and the ImgH is 2.813 mm.

FIG. 37 shows each of the aspheric coefficients of the object-side surfaces 31, 41, 51, 61 and 71 and the image-side surfaces 32, 42, 52, 62 and 72 of the eighth embodiment in formula (1).

Additionally, the relationship between each of the important parameters pertaining to the optical imaging system 10 of the eighth embodiment is as shown in FIG. 40 and FIG. 41.

Figures 35A, 35B, 35C, 35D:
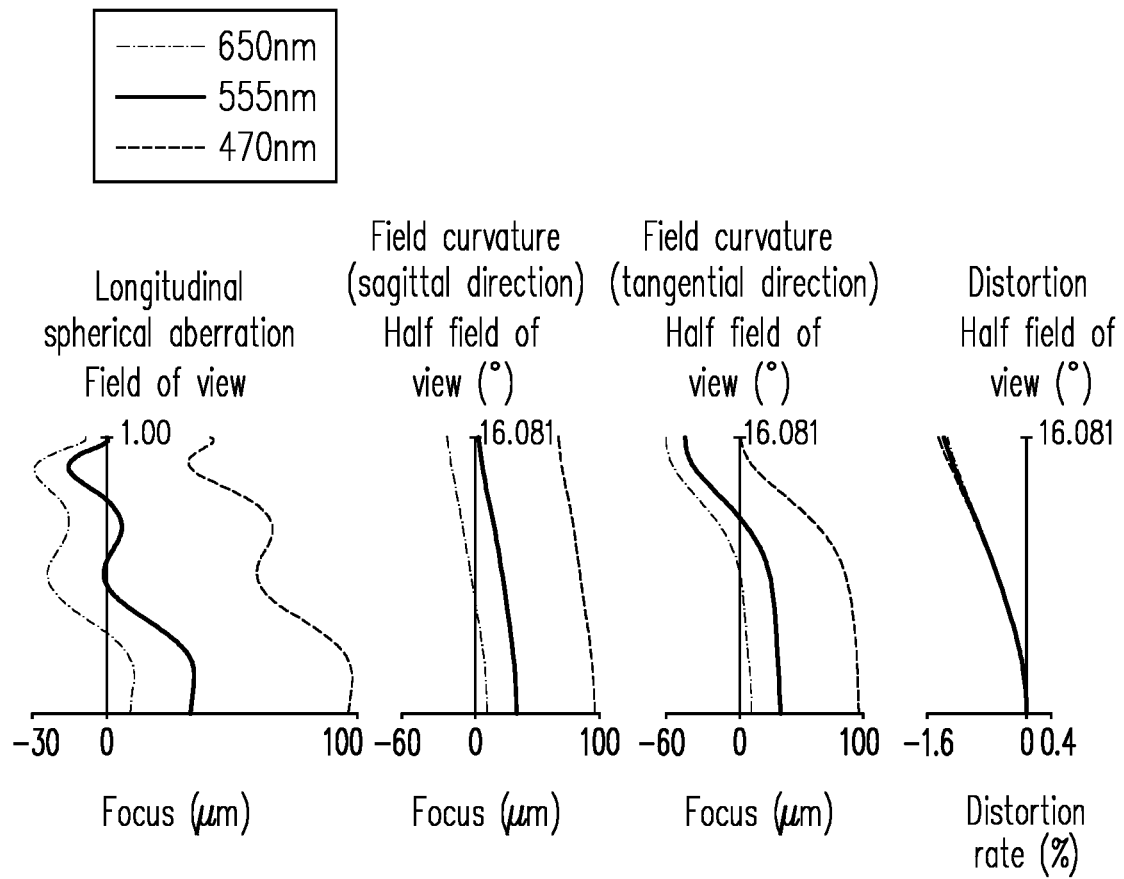
FIG. 35A to FIG. 35D illustrate a longitudinal spherical aberration and other aberrations of the optical imaging system according to the eighth embodiment of the invention.

In the longitudinal spherical aberration figure of FIG. 35A of the eighth embodiment in the condition that the pupil radius thereof is 2.0536 mm, the imaging point deviation of off-axis rays at different heights is controlled within a range of ±100 microns. In the two field curvature aberration figures of FIG. 35B and FIG. 35C, the focal length variation amount of the three representative wavelengths in the entire field of view falls within a range of ±100 microns. The distortion aberration figure of FIG. 35D shows that the distortion aberration of the eighth embodiment is maintained within a range of ±1.5%. Accordingly, by comparing the eighth embodiment with the current optical lens, the eighth embodiment still can provide preferable imaging quality in the condition that the TTL is reduced to about 9.711 mm.

It can be known from the above that the advantages of the eighth embodiment in comparison with the first embodiment are: the HFOV of the eighth embodiment is less than that of the first embodiment, which facilitates increasing the telephoto properties, the distortion of the eighth embodiment is less than that of the first embodiment, and as the difference of the thicknesses of the lens elements in the vicinity of the optical axis I and the thicknesses of the lens elements in the vicinity of the periphery in the second embodiment is smaller, the eighth embodiment is easier to be manufactured than the first embodiment and thus, has a better yield rate.

FIG. 38 to FIG. 41 show tables of the optical parameters of the eight embodiments. Through the arrangement of the below designs operated with one another, the lens length can be effectively reduced and ensure imaging quality at the same time, and the clarity for partially or entirely imaging the object can be improved.

1. The convex portion 311 of the object-side surface 31 of the first lens element 3 presenting in the vicinity of the optical axis I can facilitate collecting the imaging rays and can achieve a better effect when the first lens element 3 having the positive refractive power is selectively equipped therewith. The second lens element 4 made of the plastic material contributes to the reduction of difficulty and cost in the fabrication and assembly. The convex portion 521 or the concave portion 522 of the image-side surface 52 of the third lens element 5 in the vicinity of the optical axis I facilitate increasing imaging quality. At least one of the object-side surface 61 and the image-side surface 62 of the fourth lens element 6 being an aspheric surface and the object-side surface 71 and the image-side surface 72 of the fifth lens element 7 being aspheric surfaces can contribute to the correction of optical aberrations, such as image distortion, chromatic aberration, coma and so on, thereby not only improving the imagining quality of the optical imaging system, but also reducing the number of the lens elements of the optical imaging system 10.

2. The aperture stop 2 located between the reflector 8 and the first lens element 3 can facilitate effectively reducing the lens length, and the aperture stop 2 located between the first lens element 3 and the second lens element 4 or between the second lens element 4 and the third lens element 5 can be favorable for reducing the f-number (Fno) without increasing the radius of the clear aperture of each of the lens elements, such that the radius of the clear aperture of each of the lens elements is less than or equal to 2.5 mm, and 7.5 mm≤EFL≤13.5 mm.

3. The reflector 8 is selectively arranged on the object side of the lens element group formed by the first to the fifth lens elements 3 to 7, and the lens elements with the refractive powers are only disposed along the second optical axis I2 or satisfy (0P1/ImgH)×Fno≤3.1, which is favorable for reducing the lens depth to meet the demands for much thinner portable electronic products. In order to preferably control the lens depth, the following conditional formula may be selectively arranged, where the preferable range is 1.3≤(OP1/ImgH)×Fno≤3.1, and the most preferable range is 1.5≤(OP1/ImgH)×Fno≤3.1.

4. The second lens element 4 having the negative refractive power or the image-side surface 42 of the second lens element 4 having the concave portion 422 in the vicinity of the optical axis may be selectively arranged for eliminating the aberration generated by the first lens element 3. The object-side surface 61 of the fourth lens element 6 having the concave portion 614 in the vicinity of the periphery or the image-side surface 72 of the fifth lens element 7 having the convex portion 724 in the vicinity of the periphery may be selectively arranged to effectively correct the aberration of local image of the object.

When the relation among the optical parameters of the optical imaging lens 10 in the embodiments of the invention satisfies at least one of the following conditional formulas, or the optical imaging system 10 has at least one of the following features, it assists a designer to design a technically feasible optical imaging system with preferable optical performance, an overall length or a lens depth that is effectively reduced.

1. In order to achieve reduced lens system length, in the embodiments of the invention, the lens element thickness and the air gap between the lens elements are suitably reduced. However, under the premise of considering the difficulty of the lens assembly process and achieving imaging quality, the lens element thickness and the air gap between the lens elements need to be adjusted together, and therefore by satisfying the numeric value limitation of the following condition formulas, the optical imaging system can achieve better configuration:

$ALT/(T4+T5) \leq 3.5$, preferably $1.8 \leq ALT/(T4+T5) \leq 3.5$, most preferably $2.4 \leq ALT/(T4+T5) \leq 3.5$;

$(G23+T3+G34)/(T1+G12+T2) \leq 1.8$, preferably $0.6 \leq (G23+T3+G34)/(T1+G12+T2) \leq 1.8$;

$AAG/(G12+G45) \leq 5.6$, preferably $1.3 \leq AAG/(G12+G45) \leq 5.6$;

$1.2 \leq OP2/ALT \leq 4.9$, preferably $1.7 \leq OP2/ALT \leq 4.9$;

$ALT/BFL \leq 2.5$, preferably $0.5 \leq ALT/BFL \leq 2.5$;

$(G23+T3+G34)/(T4+G45+T5) \leq 1.7$, preferably $0.3 \leq (G23+T3+G34)/(T4+G45+T5) \leq 1.7$; and $(G23+T3+G34)/(T4+T5) \leq 1.7$, preferably $0.8 \leq (G23+T3+G34)/(T4+T5) \leq 1.7$.

2. In order to maintain a ratio of the optical element parameter to the lens length at a suitable value, satisfying at least one of the following conditional formulas can facilitate preventing difficulty in manufacturing due to small parameters or excessive system length of the lens due to large parameters:

$TL/BFL \leq 3.5$, preferably $0.8 \leq TL/BFL \leq 3.5$;

$TTL/(T1+T2+T3) \leq 6.0$, preferably $1.8 \leq TTL/(T1+T2+T3) \leq 6.0$, most preferably $1.8'TTL/(T1+T2+T3) \leq 5.6$;

$TL/(T4+T5) \leq 4.5$, preferably $2.8 \leq TL/(T4+T5) \leq 4.5$; and $TL/(T1+G12+T2) \leq 4.2$, preferably $2.8TL/(T1+G12+T2) \leq 4.2$.

3. In order to maintain a ratio of the effective focal length (EFL) to the lens length at a suitable value, satisfying at least one of the following conditional formulas can facilitate preventing difficulty in capturing a far object in the lens due to small parameters, or excessive system length of the lens due to large parameters:

$0.6 \leq OP2/EFL \leq 2.7$, preferably $1.0 \leq OP2/EFL \leq 1.6$; and $TTL/EFL \leq 1.2$, preferably $0.7TTL/EFL1.2$.

4. In order to achieve preferable arrangement of the lens depth and the lens length, and prevent difficulty in thinning the portable electronic products due to large lens depths, satisfying at least one of the following conditional formulas can meet the demands for thinner products:

$2.2 \leq OP2/OP1 \leq 8.8$, preferably $3.4 \leq OP2/OP1 \leq 5.9$; and $1.6TTL/OP1 \leq 6.5$, preferably $2.3 \leq TTL/OP1 \leq 4.7$.

5. In order to effectively reduce the chromatic aberration of the optical imaging system 10, satisfying at least one of the following conditional formulas can facilitate improving imaging quality:

$0.0 \leq |v5-v2| \leq 30.0; 0.0 \leq |v4-v3| \leq 30.0$.

6. The reflector 8 may be a prism or a mirror, which satisfies higher demands for thinner portable electronic products.

However, in view of unpredictability in optical system design, under the architectures according to the embodiments of the invention, satisfying the aforementioned formulas can facilitate preferably achieving the reduction of the lens length of the embodiments of the invention, increasing the aperture, improving the imaging quality, or enhancing the assembly yield rate, thereby improving disadvantages of the related art.

Based on the above, the optical imaging system 10 of the embodiments of the invention may also achieve the following efficacies and advantages:

1. The longitudinal spherical aberration, the field curvature, and the distortion of each embodiment of the invention can all satisfy usage criteria. Moreover, the three representative wavelengths of 650 nm, 555 nm and 470 nm are all concentrated in the vicinity of the imaging point at different heights of off-axis rays, and it can be seen from the deflection amplitude of each curve that the imaging point deviations of off-axis rays at different heights can be well controlled to have good spherical aberration and capability to suppress the aberration distortion. Referring further to the imaging quality data, the distances between the three representative wavelengths of 650 nm, 555 nm, and 470 nm are also relatively close, which indicates that the concentration of rays having different wavelengths under various states in the embodiments of the invention is good and excellent dispersion reduction capability is achieved, and therefore it can be known from the above that the embodiments of the invention have good optical performance.

2. In addition, the aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. It should be noted that the above-described details can be optionally combined and applied to the other embodiments of the invention under the condition where they are not in conflict with one another.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An optical imaging system, comprising a first lens element, a second lens element, a third lens element, a fourth lens element and a fifth lens element in order along an optical axis from an object side to an image side, wherein the first lens element to the fifth lens element each comprises an object-side surface facing towards the object side and allowing imaging rays to pass through and an image-side surface facing towards the image side and allowing the imaging rays to pass through, and wherein the first lens element is arranged to be a lens element in a first order from the object side to the image side, the second lens element is arranged to be a lens element in a second order from the object side to the image side, the third lens element is arranged to be a lens element in a third order from the object side to the image side, the fourth lens element is arranged to be a lens element in a fourth order from the object side to the image side, and the fifth lens element is arranged to be a lens element in a fifth order from the object side to the image side;

the image-side surface of the first lens element having a concave portion in a vicinity of the optical axis;
the object-side surface of the second lens element having a convex portion in a vicinity of the optical axis;
the image-side surface of the third lens element having a concave portion in a vicinity of the optical axis, and the image-side surface of the third lens element having a concave portion in a vicinity of a periphery of the third lens element;
the object-side surface of the fourth lens element having a concave portion in a vicinity of a periphery of the fourth lens element, and the image-side surface of the fourth lens element having a convex portion in a vicinity of the optical axis;
lens elements of the optical imaging lens being only the five lens elements described above;
the optical imaging system satisfying following conditions: $TTL/EFL \leq 1.2$, wherein TTL represents a distance from the object-side surface of the first lens element to an image plane of the optical imaging system along the optical axis, and EFL represents an effective focal length of the optical imaging system.

2. The optical imaging system according to claim 1, wherein the optical imaging system satisfies: ALT/(T4+T5) ≤3.5, wherein ALT represents a sum of thicknesses of the first lens element, the second lens element, the third lens element, the fourth lens element and the fifth lens element along the optical axis, T4 represents a thickness of the fourth lens element along the optical axis, and T5 represents a thickness of the fifth lens element along the optical axis.

3. The optical imaging system according to claim 1, wherein the optical imaging system satisfies: TTL/(T1+T2+T3)≤6.0, wherein T1 represents a thickness of the first lens element along the optical axis, T2 represents a thickness of the second lens element along the optical axis, and T3 represents a thickness of the third lens element along the optical axis.

4. The optical imaging system according to claim 1, wherein the optical imaging system satisfies: ATL/BFL≤2.5, wherein ALT represents a sum of thicknesses of the first lens element, the second lens element, the third lens element, the fourth lens element and the fifth lens element along the optical axis, and BFL represents a distance from the image-side surface of the fifth lens element to the image plane of the optical imaging system along the optical axis.

5. The optical imaging system according to claim 1, wherein the optical imaging system satisfies: TL/(T1+G12+T2)≤4.2, wherein TL represents a distance from the object-side surface of the first lens element to the image-side surface of the fifth lens element along the optical axis, T1 represents a thickness of the first lens element along the optical axis, G12 represents an air gap from the first lens element to the second lens element along the optical axis, and T2 represents a thickness of the second lens element along the optical axis.

6. The optical imaging system according to claim 1, wherein the optical imaging system satisfies: (G23+T3+G34)/(T1+G12+T2)≤1.8, wherein G23 represents an air gap from the second lens element to the third lens element along the optical axis, T3 represents a thickness of the third lens element along the optical axis, G34 represents an air gap from the third lens element to the fourth lens element along the optical axis, T1 represents a thickness of the first lens element along the optical axis, G12 represents an air gap from the first lens element to the second lens element along the optical axis, and T2 represents a thickness of the second lens element along the optical axis.

7. The optical imaging system according to claim 1, wherein the optical imaging system satisfies: TL/BFL≤3.5, wherein TL represents a distance from the object-side surface of the first lens element to the image-side surface of the fifth lens element along the optical axis, and BFL represents a distance from the image-side surface of the fifth lens element to the image plane of the optical imaging system along the optical axis.

8. An optical imaging system, comprising a first lens element, a second lens element, a third lens element, a fourth lens element and a fifth lens element in order along an optical axis from an object side to an image side, wherein the first lens element to the fifth lens element each comprises an object-side surface facing towards the object side and allowing imaging rays to pass through and an image-side surface facing towards the image side and allowing the imaging rays to pass through, and wherein the first lens element is arranged to be a lens element in a first order from the object side to the image side, the second lens element is arranged to be a lens element in a second order from the object side to the image side, the third lens element is arranged to be a lens element in a third order from the object side to the image side, the fourth lens element is arranged to be a lens element in a fourth order from the object side to the image side, and the fifth lens element is arranged to be a lens element in a fifth order from the object side to the image side;

the image-side surface of the first lens element having a concave portion in a vicinity of the optical axis, and the image-side surface of the first lens element having a concave portion in a vicinity of a periphery of the first lens element;

the object-side surface of the second lens element having a convex portion in a vicinity of the optical axis, and the image-side surface of the second lens element having a concave portion in a vicinity of a periphery of the second lens element;

the image-side surface of the third lens element having a concave portion in a vicinity of the optical axis;

the image-side surface of the fourth lens element having a convex portion in a vicinity of the optical axis;

lens elements of the optical imaging lens being only the five lens elements described above;

the optical imaging system satisfying following conditions: TTL/EFL≤1.2, wherein TTL represents a distance from the object-side surface of the first lens element to an image plane of the optical imaging system along the optical axis, and EFL represents an effective focal length of the optical imaging system.

9. The optical imaging system according to claim 8, wherein the optical imaging system satisfies: ALT/(T4+T5) ≤3.5, wherein ALT represents a sum of thicknesses of the first lens element, the second lens element, the third lens element, the fourth lens element and the fifth lens element along the optical axis, T4 represents a thickness of the fourth lens element along the optical axis, and T5 represents a thickness of the fifth lens element along the optical axis.

10. The optical imaging system according to claim 8, wherein the optical imaging system satisfies: TTL/(T1+T2+T3)≤6.0, wherein T1 represents a thickness of the first lens element along the optical axis, T2 represents a thickness of the second lens element along the optical axis, and T3 represents a thickness of the third lens element along the optical axis.

11. The optical imaging system according to claim 8, wherein the optical imaging system satisfies: ATL/BFL≤2.5, wherein ALT represents a sum of thicknesses of the first lens element, the second lens element, the third lens element, the fourth lens element and the fifth lens element along the optical axis, and BFL represents a distance from the image-side surface of the fifth lens element to the image plane of the optical imaging system along the optical axis.

12. The optical imaging system according to claim 8, wherein the optical imaging system satisfies: TL/(T1+G12+T2)≤4.2, wherein TL represents a distance from the object-side surface of the first lens element to the image-side surface of the fifth lens element along the optical axis, T1 represents a thickness of the first lens element along the optical axis, G12 represents an air gap from the first lens element to the second lens element along the optical axis, and T2 represents a thickness of the second lens element along the optical axis.

13. The optical imaging system according to claim 8, wherein the optical imaging system satisfies: TL/BFL≤3.5, wherein TL represents a distance from the object-side sur- face of the first lens element to the image-side surface of the fifth lens element along the optical axis, and BFL represents a distance from the image-side surface of the fifth lens element to the image plane of the optical imaging system along the optical axis.

14. The optical imaging system according to claim 8, wherein the optical imaging system satisfies: $|v4-v3|\leq 30.0$, wherein v4 represents an Abbe number of the fourth lens element, and v3 represents an Abbe number of the third lens element.

15. An optical imaging system, comprising a first lens element, a second lens element, a third lens element, a fourth lens element and a fifth lens element in order along an optical axis from an object side to an image side, wherein the first lens element to the fifth lens element each comprises an object-side surface facing towards the object side and allowing imaging rays to pass through and an image-side surface facing towards the image side and allowing the imaging rays to pass through, and wherein the first lens element is arranged to be a lens element in a first order from the object side to the image side, the second lens element is arranged to be a lens element in a second order from the object side to the image side, the third lens element is arranged to be a lens element in a third order from the object side to the image side, the fourth lens element is arranged to be a lens element in a fourth order from the object side to the image side, and the fifth lens element is arranged to be a lens element in a fifth order from the object side to the image side;

the object-side surface of the second lens element having a convex portion in a vicinity of the optical axis, and the object-side surface of the second lens element having a convex portion in a vicinity of a periphery of the second lens element;

the image-side surface of the third lens element having a concave portion in a vicinity of the optical axis, and the image-side surface of the third lens element having a concave portion in a vicinity of a periphery of the third lens element;

the object-side surface of the fifth lens element having a concave portion in a vicinity of a periphery of the fifth lens element;

lens elements of the optical imaging lens being only the five lens elements described above;

the optical imaging system satisfying following conditions: TTL/EFL$\leq$1.2 and AAG/(G12+G45)$\leq$5.6, wherein TTL represents a distance from the object-side surface of the first lens element to an image plane of the optical imaging system along the optical axis, EFL represents an effective focal length of the optical imaging system, AAG represents a sum of four air gaps from the first lens element to the fifth lens element along the optical axis, G12 represents an air gap from the first lens element to the second lens element along the optical axis, and G45 represents an air gap from the fourth lens element to the fifth lens element along the optical axis.

16. The optical imaging system according to claim 15, wherein the optical imaging system further satisfies: (G23+T3+G34)/(T1+G12+T2)$\leq$1.8, wherein G23 represents an air gap from the second lens element to the third lens element along the optical axis, T3 represents a thickness of the third lens element along the optical axis, G34 represents an air gap from the third lens element to the fourth lens element along the optical axis, T1 represents a thickness of the first lens element along the optical axis, and T2 represents a thickness of the second lens element along the optical axis.

17. The optical imaging system according to claim 15, wherein the optical imaging system further satisfies: TTL/(T1+T2+T3)$\leq$6.0, wherein T1 represents a thickness of the first lens element along the optical axis, T2 represents a thickness of the second lens element along the optical axis, and T3 represents a thickness of the third lens element along the optical axis.

18. The optical imaging system according to claim 15, wherein the optical imaging system further satisfies: $|v5-v2|\leq 30.0$, wherein v5 represents an Abbe number of the fifth lens element, and v2 represents an Abbe number of the second lens element.

19. The optical imaging system according to claim 15, wherein the optical imaging system further satisfies: (G23+T3+G34)/(T4+G45+T5)$\leq$1.7, wherein G23 represents an air gap from the second lens element to the third lens element along the optical axis, T3 represents a thickness of the third lens element along the optical axis, G34 represents an air gap from the third lens element to the fourth lens element along the optical axis, T4 represents a thickness of the fourth lens element along the optical axis, and T5 represents a thickness of the fifth lens element along the optical axis.

20. The optical imaging system according to claim 15, wherein the optical imaging system further satisfies: TL/(T4+T5)$\leq$4.5, wherein TL represents a distance from the object-side surface of the first lens element to the image-side surface of the fifth lens element along the optical axis, T4 represents a thickness of the fourth lens element along the optical axis, and T5 represents a thickness of the fifth lens element along the optical axis.

\* \* \* \* \*